US009385918B2

(12) United States Patent
Civilini et al.

(10) Patent No.: US 9,385,918 B2
(45) Date of Patent: Jul. 5, 2016

(54) SYSTEM AND METHOD FOR SECURE PROVISIONING OF VIRTUALIZED IMAGES IN A NETWORK ENVIRONMENT

(75) Inventors: Massimo Civilini, Redwood City, CA (US); Elaine Cheong, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1102 days.

(21) Appl. No.: 13/460,830

(22) Filed: Apr. 30, 2012

(65) Prior Publication Data
US 2013/0290694 A1 Oct. 31, 2013

(51) Int. Cl.
*H04L 12/24* (2006.01)
*H04L 29/06* (2006.01)
*H04L 12/931* (2013.01)

(52) U.S. Cl.
CPC ........ *H04L 41/0806* (2013.01); *H04L 41/0869* (2013.01); *H04L 41/28* (2013.01); *H04L 49/65* (2013.01)

(58) Field of Classification Search
None
See application file for complete search history.

(56) References Cited

U.S. PATENT DOCUMENTS

| 7,082,527 | B2 * | 7/2006 | Zimmer ................. G06F 9/4405 709/232 |
| 7,162,509 | B2 * | 1/2007 | Brown ...................... G06F 8/20 709/201 |
| 7,310,338 | B1 * | 12/2007 | Foltan ..................... H04L 12/66 370/389 |
| 7,415,519 | B2 * | 8/2008 | Abbondanzio et al. ....... 709/226 |
| 7,440,998 | B2 * | 10/2008 | Hiray .................... G06F 9/4405 709/203 |
| 7,574,491 | B2 * | 8/2009 | Stein et al. .................... 709/220 |
| 7,802,084 | B2 * | 9/2010 | Fitzgerald et al. ................ 713/2 |
| 7,877,590 | B2 * | 1/2011 | Van Patten Benhase ............... G06F 3/0605 709/220 |
| 7,917,533 | B2 * | 3/2011 | Nagami et al. ................ 707/785 |
| 8,254,579 | B1 * | 8/2012 | Morgan .................. H04L 9/083 713/1 |
| 8,316,248 | B2 * | 11/2012 | Yokota et al. ................. 713/310 |
| 8,429,650 | B2 * | 4/2013 | Ferwerda et al. ............. 709/225 |
| 8,462,666 | B2 * | 6/2013 | Subramanian ...... H04L 41/0806 370/254 |

(Continued)

FOREIGN PATENT DOCUMENTS

| EP | 1944711 | 7/2008 |
| EP | 2043320 | 4/2009 |
| WO | WO2013/165811 | 11/2013 |

OTHER PUBLICATIONS

PCT Nov. 4, 2014 International Preliminary Report on Patentability and Written Opinion of the International Searching Authority from International Application No. PCT/US2013/038259.

(Continued)

*Primary Examiner* — Patrice Widner
(74) *Attorney, Agent, or Firm* — Patent Capital Group

(57) ABSTRACT

An example method includes setting up a secure channel between a blade and a provisioning server in a network environment, downloading an image of a virtual machine monitor (VMM) from the provisioning server to the blade through the secure channel, and booting the image to instantiate the VMM on the blade. The blade and the provisioning server are mutually authenticated and authorized with a plurality of parameters. Booting the image may include loading the image on a memory element of the blade and transferring control to the image. In some embodiments, booting the image includes modifying a root file system of the image by adding the daemon such that an agent is included in the root file system. The agent can download another image corresponding to an operating system of a virtual machine.

20 Claims, 12 Drawing Sheets

(56) References Cited

U.S. PATENT DOCUMENTS

| | | | |
|---|---|---|---|
| 8,479,209 B2* | 7/2013 | Gebhart et al. | 718/104 |
| 8,856,544 B2* | 10/2014 | Bosch et al. | 713/187 |
| 8,958,340 B2* | 2/2015 | Bao | H04L 41/046 370/252 |
| 8,959,325 B2* | 2/2015 | Cook et al. | 713/2 |
| 9,032,014 B2* | 5/2015 | Diaz | G06F 11/2025 709/202 |
| 9,047,468 B2* | 6/2015 | Sakthikumar | H04L 63/061 |
| 2004/0081104 A1* | 4/2004 | Pan | H04L 49/65 370/254 |
| 2004/0255000 A1* | 12/2004 | Simionescu | H04L 41/0803 709/208 |
| 2007/0250608 A1* | 10/2007 | Watt | 709/222 |
| 2009/0169020 A1* | 7/2009 | Sakthikumar et al. | 380/278 |
| 2009/0172125 A1* | 7/2009 | Shekhar et al. | 709/215 |
| 2009/0300180 A1 | 12/2009 | Dehaan et al. | |
| 2010/0049839 A1 | 2/2010 | Parker et al. | |
| 2010/0138526 A1 | 6/2010 | Dehaan et al. | |
| 2010/0318993 A1* | 12/2010 | Goud et al. | 718/1 |
| 2012/0166786 A1* | 6/2012 | Selitser | 713/2 |
| 2012/0173653 A1* | 7/2012 | Bland et al. | 709/213 |
| 2013/0311632 A1* | 11/2013 | Chang et al. | 709/223 |

OTHER PUBLICATIONS

Intel Corporation, "Boot Integrity Services Application Programming Interface," Version 1.0, Dec. 28, 1998, © 1998, 64 pages.

J. Salowey, et al., "Transport Layer Security (TLS) Session Resumption without Server-Side State," Network Working Group, RFC 4507, May 2006, 18 pages.

PCT—Jul. 3, 2013 International Search Report and Written Opinion of the International Searcing Authority from International Application No. PCT/US2013/038259.

* cited by examiner

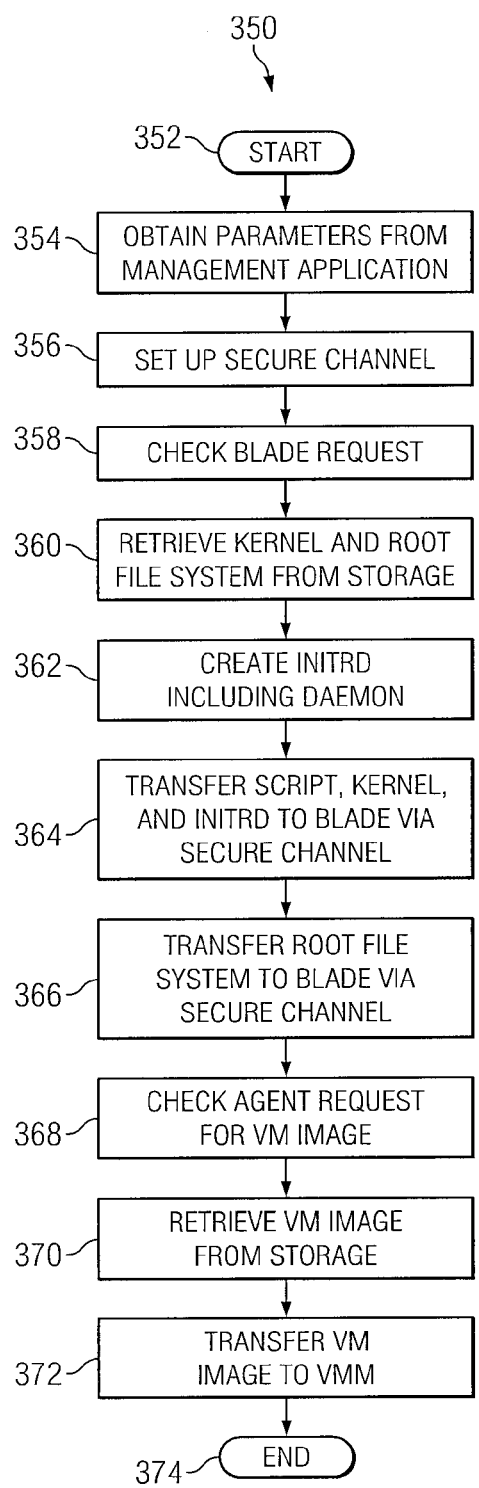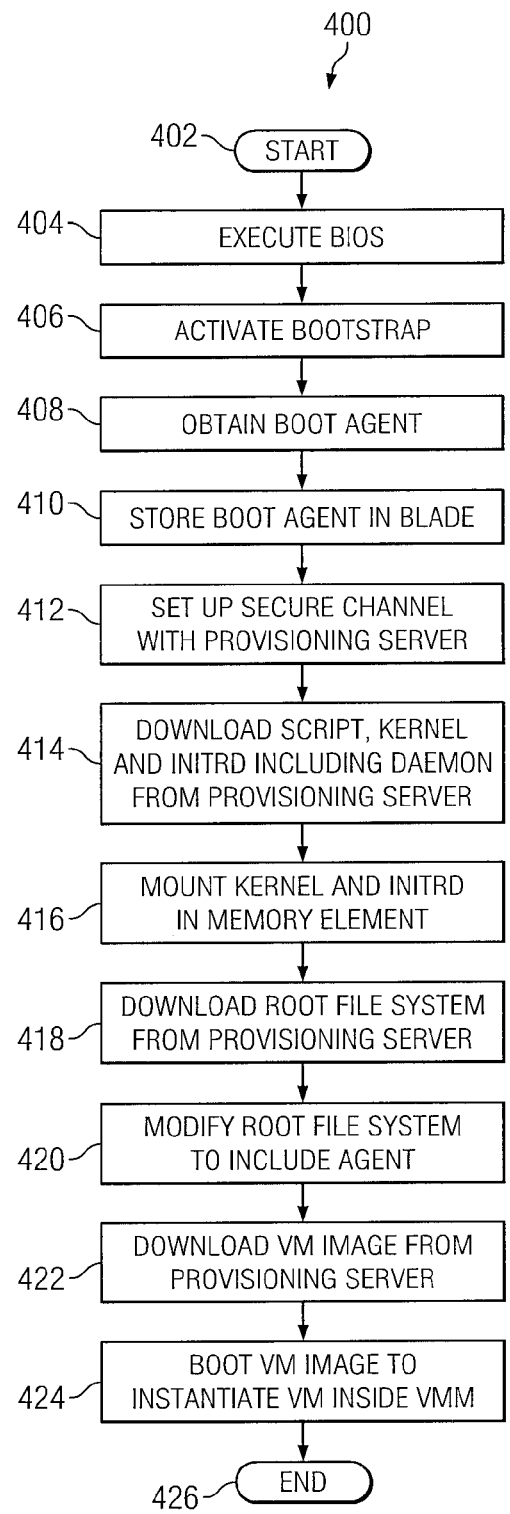
FIG. 13
FIG. 14

| 4 PROVISIONING SERVERS | 320 BLADES (64VMs PER BLADE) | 200 BLADES (64VMs PER BLADE) | 100 BLADES (64VMs PER BLADE) |
|---|---|---|---|
| 1000 IMAGES | 400 MINUTES (92%) | 345 MINUTES (90%) | 300 MINUTES (82%) |
| 2000 IMAGES | 650 MINUTES (88%) | 610 MINUTES (82%) | 570 MINUTES (66%) |
| 5000 IMAGES | 1450 MINUTES (73%) | 1400 MINUTES (59%) | 1350 MINUTES (20%) |
| BASELINE | 5400 MINUTES | 3400 MINUTES | 1700 MINUTES |

SYSTEM AND METHOD FOR SECURE PROVISIONING OF VIRTUALIZED IMAGES IN A NETWORK ENVIRONMENT

TECHNICAL FIELD

This disclosure relates in general to the field of communications and, more particularly, to a system and a method for secure provisioning of virtualized images in a network environment.

BACKGROUND

A trend towards virtualization in the information technology (IT) arena is driving the development of many virtualization technologies, such as network virtualization and computing virtualization. Network virtualization solutions can consolidate multiple physical networks into one virtual network. They can also logically segment a single physical network into multiple logical networks. Partitions can be added to rapidly scale the network for business needs. Computing virtualization (e.g., generating multiple virtual environments on a single physical platform) can allow consolidation of computing platforms in terms of hardware investments and physical space. Network and computing virtualization represent a new IT paradigm: challenging existing physical network deployment models. Network and computing virtualization offer many benefits, such as expanding availability of single IT assets to multiple users, managing multiple IT assets as a single resource, and providing dedicated virtual networks for applications, which leads to revenue generation, expense reduction, and customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 13 is a simplified flow diagram illustrating yet other example operations that may be associated with embodiments of the system;

FIG. 14 is a simplified flow diagram illustrating yet other example operations that may be associated with embodiments of the system;

DETAILED DESCRIPTION OF EXAMPLE EMBODIMENTS

Overview

An example method includes setting up a secure channel between a blade and a provisioning server in a network environment. The term 'setting up' in this context can include any suitable activity associated with initiating, establishing, provisioning, or otherwise creating a secure channel. The method also includes downloading an image of a virtual machine monitor (VMM) from the provisioning server to the blade through the secure channel, and booting the image to instantiate the VMM on the blade. The blade and the provisioning server are mutually authenticated and authorized with a plurality of parameters. In specific embodiments, the parameters can include image parameters, cryptographic parameters and network parameters. Examples of the image parameters can include an image name and path, a kernel, a kernel boot option, a root file system, and an image type. Examples of the cryptographic parameters include entropy, a provisioning server public key, a provisioning server private key, a certificate, and a blade server shared key. Examples of the network parameters include a blade Internet Protocol address, a netmask, a gateway IP address, a blade identifier, and a provisioning server IP address.

In particular embodiments, booting the image may include loading the image on a memory element of the blade and transferring control to the image. In other embodiments, booting the image may include modifying a root file system of the image by adding a daemon such that an agent is included in the root file system. The agent can cause a connection to the provisioning server through the secure channel to download another image corresponding to a virtual machine from the provisioning server.

In some embodiments, the secure channel may be set up using a transport layer security protocol. The image may be downloaded using a Hyper Text Transfer Protocol Secure protocol (HTTPS). In various embodiments, at least a portion of the plurality of parameters may be retrieved from a switch managing the blade. In other embodiments, the method may further include intercepting a boot request from a basic input/output system of the blade, customizing a boot agent code with the plurality of parameters to generate a boot agent, and transferring the boot agent to the blade in response to the boot request. The boot agent code may be valid for substantially all blades in a blade server. In more specific embodiments, the transferring may be over a physical connection, such as Ethernet connection, optical fiber connection, or non-Ethernet connection.

Example Embodiments

Figure 1:
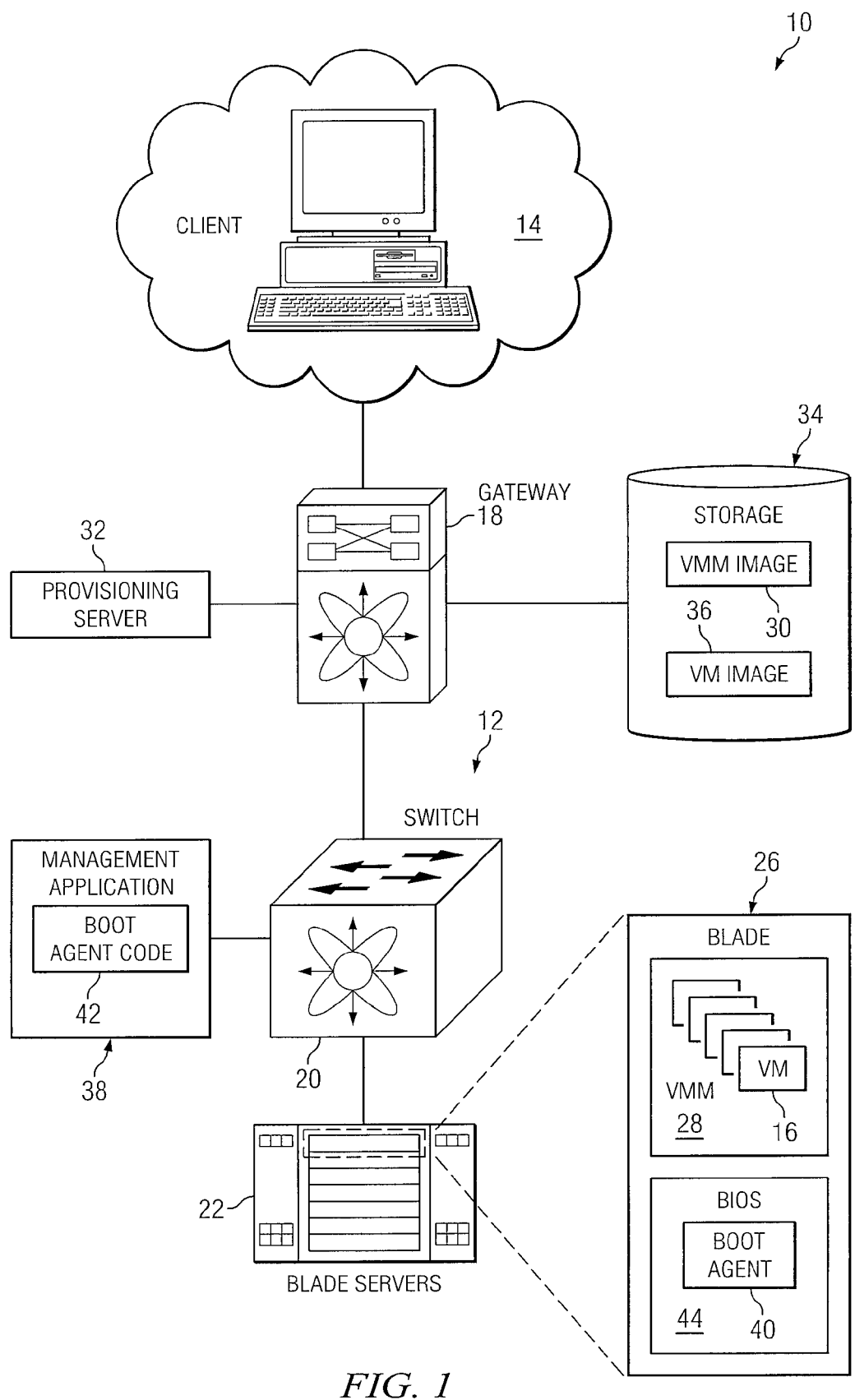
FIG. 1 is a simplified block diagram illustrating a system for secure provisioning of virtualized images in a network environment.

Turning to FIG. 1, FIG. 1 is a simplified block diagram illustrating a communication system 10 for secure provisioning of virtualized images in a network environment. FIG. 1 illustrates a network 12 in which a client 14 communicates with a virtual machine (VM) 16 via a gateway 18. A switch 20 may route the communication from client 14 to blade servers 22 over one or more Ethernet cables (e.g., 10GE) or optical fiber cables. Blade servers 22 may contain one or more blades. As used herein, the term "blade" encompasses a computer or processor that can perform computational tasks for clients (e.g., client 14) over a network (e.g., network 12). Blades can include server computers such as database servers, file servers, mail servers, print servers, and web servers; personal computers (e.g., blade PC) that operate in conjunction with a client access device such as a thin client (e.g., client 14); and workstations (e.g., blade workstations) that operate similarly to a blade PC, with more computing power. Blades can also provide switching, routing, storage, and fiber-channel access functionalities. An example of a blade is a blade server, which can be a stripped-down server computer with a modular design optimized to minimize use of physical space and energy. Typically, a blade server comprises a modular card that includes a processor, memory, input/output, and non-volatile program storage (e.g., flash memory, hard disk drive).

Embodiments of communication system 10 can provide a computing virtualization network environment. An example blade 26 in blade servers 22 is shown in greater detail as including a virtual machine monitor (VMM) 28 that hosts VM 16. VMM 28 may be booted on blade 26 using a stateless VMM image 30 obtained from a provisioning server 32. As used herein, the term "image" is a single file containing contents and structure representing software (e.g., operating system (OS), application). In various embodiments, VMM image 30 may include a kernel, root file system, and other components of VMM 28. Images may be "stateless" or "stateful." A "stateless" image does not contain the state (e.g., snapshot of properties, such as configuration information at a particular moment in time, user configurations, etc.) of the software or the storage device. In addition, a "stateful" image contains the state of the software or the storage device. For example, the stateful image may contain user configurations (or device configurations) that render the image specific to a particular user (or device). In various embodiments, VMM image 30 may be a stateless images stored on a storage 34. Because VMM image 30 is stateless, multiple blades (e.g., 26) in network 12 may access and download VMM image 30 to instantiate VMM 28 thereon.

VM 16 may also be installed on VMM 28 using a stateless VM image 36 from provisioning server 32. In some embodiments, VM image 36 may include an image comprising an operating system (e.g., Windows® 7) of VM 16, and several applications (e.g., Microsoft Office®, Adobe Acrobat®, etc.) installed thereon. In other embodiments, VM image 36 may comprise a plurality of images including a separate image for the operating system, and each of the applications. In yet other embodiments, VM image 36 may include either a particular operating system image, or a particular application image. For example, a complete install of VM 16 on blade 26 may involve booting thousands of VM images 36, each image corresponding to a specific application or operating system.

VM image 36 may also be stored on storage 34. A management application 38 may enable a boot agent 40 to be created using a boot agent code 42.

As used herein, the term "boot agent code" refers to an application configured to perform the various booting operations described herein. In particular, boot agent code 42 is an application that is valid for substantially all blades in communication system 10. The term "boot agent" refers to another application similar to the boot agent code, but customized for a specific blade (e.g., blade 26) and a specific VM (e.g., VM 16) in communication system 10. In an example embodiment, boot agent 40 may be a variation of boot agent code 42, with a plurality of parameters (specific to blade 26 and/or VM 16) physically copied into a specific location in the program instructions. In various embodiments, boot agent code 42 may be blended with the plurality of parameters that are specific to blade 26, and/or VM 16, to generate boot agent 40. Management application 38 may transfer boot agent 40 to a basic input/output system (BIOS) 44 on blade 26 to facilitate secure provisioning of VMM image 30 and VM image 36 to blade 26.

According to various embodiments, communication system 10 can enable secure provisioning of virtualized software (e.g., VMM image 30 and VM image 36) to bare metal blades (e.g., blade 26) and to virtual machines (e.g., VM 16). As used herein, the term "bare metal blade" refers to a blade that does not contain an OS or any software. When blade 26 is powered on, BIOS 44 may be executed and a bootstrap process may be activated with a bootstrap request. The bootstrap request may be intercepted by management application 38. Management application 38 may create boot agent 40 from boot agent code 42, and pass boot agent 40 to BIOS 44.

Boot agent 40 may be stored in a memory element (e.g., hard disk drive) of blade 26. Boot agent 40 may be mounted to the memory element (e.g., volatile memory such as random access memory (RAM)) during the booting process. Boot agent 40 may create a secure channel with provisioning server 32 using the plurality of parameters and download VMM image 30 to blade 26. VMM image 30 may be thereafter loaded in the memory element of blade 26 and may receive control from boot agent 40. To instantiate VM 16, VMM 28 may be customized by including a daemon during the VMM image download process, and VMM 28 can thereafter securely download VM image 36.

As used herein, the term "secure channel" refers to a communication channel with a security layer (e.g., Secure Sockets Layer (SSL), Transport Layer Security (TLS), etc.) for example, that resides between an application and transport layer. Cryptographic keys are used to protect information flowing through the secure channel and to authenticate and authorize the parties communicating over the secure channel. In a general sense, the secure channel prevents eavesdropping, impersonation, and tampering. Security of the secure channel may be achieved by authentication of a source (e.g., provisioning server 32) of VMM image 30 or VM image 36 and privacy of the secure channel realized, for example, through cryptographic encryption methods. In some embodiments, the authentication of provisioning server 32 may be realized using cryptographic certificates (e.g. X 509) and/or cryptographic shared or public keys that are set up in provisioning server 32 and in the plurality of parameters for boot agent 40 by management application 38 before initiating the blade bootstrap process.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Booting is a set of operations that a computer performs when electrical power is switched on. When the computer is turned on, it starts the bootstrap process that will bring it to a state where a friendly interface would allow a user a smooth interaction with its computing capabilities. The bootstrap process is composed of several serialized steps involving the entire infrastructure of the computer, from the hardware to the high-level software. In terms of functional structure, the main components associated with a typical bootstrap process are hardware, BIOS, OS, and applications.

The bootstrap process begins when the computer, which has been turned off, is re-energized (or receives a soft reboot command), and ends when the computer is ready to perform its normal operations. The process typically involves performing power-on self-test, locating and initializing peripheral devices, and finding, loading and starting the OS. Turning on the computer allows electric current to flow in the hardware and generate a basic reset to every hardware component of the computer and, in particular, to the central processing unit (CPU) and other processors ("chipset.") The typical response to the reset is a basic state where control is passed to the BIOS.

BIOS is software that resides in the computer and is specific for that hardware. In the BIOS, the chipset is initialized to a well-defined state. Thereafter, the BIOS seeks and finds the OS and passes control to the OS. The OS, unlike the BIOS, can reside in many different media. Usually, the OS is located using predetermined user settings, such as floppy disk drive (FDD), hard disk drive (HDD), CD-ROM, USB stick, network, and others. Because the BIOS does not know the location of the OS apriori, and the OS can be located on different kinds of media, BIOS typically uses one of two processes to pass control to the OS: (1) standard boot; and (2) International Organization for Standardization (ISO) image download.

In a typical boot process, BIOS accesses the local storage media of the computer, and loads a boot loader in memory, then completes its operations by passing the control to the boot loader. The boot loader is a small program (typically a top portion (e.g., first 512 bytes) of the OS) that is responsible for loading the rest of the OS from the media (e.g., HDD) to the memory element (e.g., RAM). The computer executes the boot loader to load the rest of the OS, applications and other data to the RAM for execution. This method allows a partial loading of the OS in memory: part of the OS remains in the media (for example, the HDD) and is used to store data that survive through computer power off. Such a booting process is said to be "stateful" because it preserves information through the power off. However, the stateful process could render the computer system vulnerable to viruses that survive the power off, for example, because the viruses are hard written on the media.

Stateful bootstrap (for example, by local hard disk unit (HDU) or Internet Small Computer System Interface/Fibre Channel (iSCSI/FC)) can be plagued by security concerns about the past history of the software that could have been modified by malware. In addition, stateless bootstrap requires a fresh copy of the software for every bootstrap to be loaded and executed in a ramdisk (i.e., a block of RAM that a computer's software treats as a disk drive). Although stateless bootstrap requires more RAM in the computer, it may be an acceptable solution to mitigate security concerns. Stateless bootstrap is often the preferred bootstrap method for data centers running a cloud environment. However, stateless bootstrap in current data center network environments is implemented using insecure protocols such as Dynamic Host Configuration Protocol (DHCP) and Trivial File Transfer Protocol (TFTP) with the ISO image download process.

ISO image download is performed during network booting, in which the computer is booted from the network rather than the local drive (e.g., HDD, FDD). Network booting can be used to centralize management of disk storage, in cluster computing (in which nodes may not have local storage media), and other such applications. In network booting, initial software (including the boot loader and OS), is loaded as an image from a server on the network. ISO image download differs from a typical boot because a complete software image of the OS is downloaded and stored in the local memory element before passing control to it. The BIOS initializes the network connection (e.g., Ethernet connection), identifies the image to download, locates the image on the network (e.g., on a network server), and downloads the image. Network booting is typically performed in a Preboot eXecution Environment (PXE) using network interfaces, independent of data storage devices or installed operating systems. PXE is typically stored in hardware Read Only Memory (ROM) that accompanies a network interface card (e.g., Ethernet card) on the computer.

PXE booting process follows a client-server model. A PXE server that stores the OS image has DHCP and TFTP configured and running thereon. The client is a blade or VM configured in BIOS to boot from the network, and executes the PXE bootstrap session right after the power on self-test process. At first, the PXE process searches for DHCP servers in the network (e.g., by broadcasting a DHCPDISCOVER packet extended with PXE specific options). An appropriately configured DHCP server replies with network parameters to logically initialize the network connection and the OS image name and location. After selecting the PXE boot server, the PXE firmware, using TFTP (which is non-encrypted), downloads the boot loader, which is uploaded into a memory element (e.g., RAM) of the client. After the boot loader is verified, the boot loader executes the booting process on the client, downloading the OS image and transferring control thereto.

ISO image download generally repeats on every bootstrap. After a power on/off, reset or a generic restart of the computer, a fresh copy of the OS image is downloaded and activated. Thus, any modifications (e.g., adding applications) made in the previous session are lost. Even though the lost data may affect productivity, such stateless bootstrap is more secure than a stateful bootstrap because typically, substantially every possible contamination by malware is lost when the system restarts from a fresh copy of the OS image. Further, PXE is an older protocol: viewed as being updated and vulnerable to security threats. For example, DHCP connection and TFTP protocol are prone to malware attacks because they lack security.

An existing network booting option is to use vMedia to download the OS image. vMedia is a boot option available in certain machines and that allows bootstrap from a disk type media dispersed in the network as if the media were a local device. vMedia is generally initialized using external settings and may be set in BIOS as a boot option. vMedia looks like a regular local hard disk boot (e.g., standard boot), whereas it is actually an image download, with associated security concerns, such as authentication of the source of the image and verification of the integrity of the image.

In data centers, loading of the computing platform software over the network infrastructure can be a critical operation for several different reasons, including: security (e.g., authentication of the source of the OS image, image transport and image integrity check); performance (e.g., for remote download of images); and management (e.g., in creation, storing, and customization of the images). Additionally, for virtualized platforms, two different operations are typically performed: 1) download of the VMM on the bare metal blade; and 2) download of the VM operating systems and applications on the VMM.

For each of these options, security and performance may be issues that render the existing PXE boot option undesirable. For example, providing a secure channel to overcome security issues may not be possible with PXE. Additional issues with creating the secure channel for downloading stateless images in current data center infrastructure include: the BIOS code on the blade may not generate enough entropy for a random number generator to ensure privacy on the download channel; in the BIOS, identity, keys and certificates cannot be stored securely; the ISO image download protocol, which is PXE utilizing TFTP, is insecure and not suitable to download large images; the PXE code utilizes the DHCP protocol to get information about the network and the image to download, but the DHCP protocol inherently cannot run on an encrypted channel.

Other than security, issues related to the download of images from the PXE server include low performance (e.g., long time to boot), download time, customization of the image, etc. Beside the fact that the images can be relatively large in size (up to several GBytes), management of the booting process, in particular, network load, can be compromised when multiple blades boot at the same time. Network load can be quite heavy especially when an entire data center platform is turned on. Moreover, storage and customization of the image can be an issue. Even if every blade downloads the same image, customized copies should be made to add entropy and identity. Such operations could require special interactions with the management application (or other administrator operations) that are not provided in current data center platforms. Also, although security concerns are less important for a VM image download (because of VMM presence), the download performance and image customization issues can be much more difficult to solve, driving a need for integration with the management application.

A current solution for the bootstrapping process proposes entropy, keys, and image information to be downloaded, however, the download process is in PXE, with its inherent security risks. For example, Boot Integrity Services (BIS) for securing PXE establishes an exclusive relationship between PXE clients and a PXE server that share the same public key. This avoids the possibility of a rogue PXE Server randomly distributing unsolicited images over a network. However, the transfer of the image over the network is not secure; thus, BIS does not prevent man-in-the-middle attacks as the image transfer process itself is unencrypted.

Communication system 10 is configured to address these issues (and others) in offering a system and method for secure provisioning of virtualized images in a network environment. Embodiments of communication system 10 can enable a provisioning solution that is integrated with management application 38 for secure image download, with optimized download performance. Boot agent 40, which can include a boot loader, can set up a secure channel between blade 26 and provisioning server 32. Boot agent 40 may be customized with a plurality of parameters specific to blade 26 and blade 26 and provisioning server 32 may be mutually authenticated and authorized with the plurality of parameters. Boot agent 40 can download VMM image 30 from provisioning server 32 to blade 26 through the secure channel and boot stateless VMM image 30 to instantiate VMM 28 on blade 26. The parameters can provide a differentiation between distinct blades (and VMs) in blade servers 22. For example, the parameters may include image parameters (e.g., name and path of VMM image 30 and VM image 36, kernel, kernel boot option, root file system, and image type), cryptographic parameters (e.g., entropy, provisioning server public key, provisioning server private key, certificate, and blade server shared key), and network parameters (e.g., blade Internet Protocol (IP) address, netmask and other address specifications of future address technologies, gateway IP address, blade identifier (ID), and provisioning server IP address).

In one embodiment, for instantiating VM 16 in blade 26, VMM 28 may be instantiated first from VMM image 30. BIOS 44 may be copied to VM 16, and VM boot may start from this copy of BIOS 44. Management application 38 may intercept a boot request from BIOS 44 for VM image 36, and pass boot agent 40, customized with appropriate parameters for VM 16, to BIOS 44. In another embodiment, boot agent code 42 may form a part of VMM 28 (e.g., in a form of a daemon inside a root file system of VMM 28), and boot agent code 42 within VMM 28 may prepare boot agent 40 with appropriate parameters obtained from management application 38, intercept a VM boot request and pass boot agent 40 to VM 16.

In various embodiments, boot agent 40 can be obtained from management application 38, which can be configured for intercepting a boot request from BIOS 44, customizing boot agent code 42 with the plurality of parameters to generate boot agent 40, and transferring boot agent 40 to blade 26 in response to the BIOS boot request. Boot agent code 42 may be valid for substantially all blades in blade servers 22. By changing the parameters as suitably desired, boot agent code 42 may be customized for each blade (e.g., 26) or each VM (e.g., VM 16) in blade servers 22.

According to an embodiment of communication system 10, boot agent code 42 may be an open source PXE implementation called gPXE. For example, boot agent code 42 may be implemented in a gPXE version on GPL2 license, GPL3 license, or similar licenses. The gPXE code can provide a basic Transmission Control Protocol/Internet Protocol (TCP/IP) stack and management of network hardware. In various embodiments, a local network Universal Network Device Interface (UNDI) driver may be used by boot agent code 42 for booting processes, instead of DHCP and DHCP options. UNDI is an application programming interface (API) for network interface cards (NICs) used by PXE and other similar environments. Thus, the DHCP protocol may be optional for boot agent code 42. Boot agent code 42 may accept the parameters via memory location, and work with TLS and HTTPS protocols, and with multiple NICs and UNDI drivers. Although gPXE is mentioned herein as an example method to create boot agent code 42, it may be noted that any generally known method may be used for creating boot agent code 42. For example, proprietary code may be modified using TCP/IP stack and adding code (e.g., computer instructions) to interface a UNDI driver to generate boot agent code 42. In various embodiments, the secure channel between blade 26 and provisioning server 32 may be established using a TLS protocol, and set up with parameters including entropy and other cryptographic parameters.

Boot agent code 42 may be stored in switch 20 as a golden copy valid for substantially every blade and VM in blade servers 22. Boot agent code 42 can include a boot loader. Boot agent 40 may be formed from boot agent code 42 and the plurality of parameters specific to blade 26 and VM 16. In one embodiment, the parameters are blended together before the transfer of boot agent 40 to blade 26. In some embodiments, boot agent code 42 may be approximately 70 KBytes in size and can be downloaded, for example, via vMedia using a virtual floppy disk drive (vFDD) interface on blade 26. The BIOS download of boot agent 40 may be made secure by vMedia, which may utilize hardware (e.g., wired or wireless) connections between blade 26 and switch 20. Management application 38 can cause a copy of boot agent code 42 to be created, and the parameters (e.g., 2 KBytes in size) to be hard-written in a copy of boot agent code 42 to generate boot agent 40.

According to various embodiments, the security of the download of boot agent 40 can be ensured by a physical connection (e.g., Ethernet connection) between blade 26 and switch 20, and the security of the secure channel between provisioning server 32 and blade 26 can be ensured by the plurality of parameters. The security of boot agent 40 can also be obtained by any available method, including secure download of boot agent 40 via vMedia connection; transfer of the parameters via direct communication between blade 26 and management application 38 with boot agent code 42 already present on the blade; and other methods.

In one embodiment, the blending of boot agent code 42 and the plurality of parameters can be performed in management application 38 when boot agent code 42 and the plurality of parameters are both in management application 38. Boot agent 40 can be subsequently transferred to blade 26 via a vMedia connection between management application 38 and blade 26. The vMedia request is interpreted and managed by management application 38, for example, at a switch level. The boot methodology using vMedia is a stateful boot, and when the boot loader portion (e.g., first 512 bytes of code) of boot agent 40 is executed in blade memory, the rest of boot agent 40 may be transferred to blade 26. Such a transfer may be secure because of the physical connection between blade 26 and switch 20.

In another example embodiment, the blending of boot agent code 42 and the plurality of parameters can be performed in BIOS 44. In embodiments, where the plurality of parameters are in management application 38, and boot agent code 42 is saved in blade 26 (e.g., as option Read Only Memory (ROM)), BIOS 44 may get the plurality of parameters using a secure connection with management application 38 and subsequently get boot agent code 42 from inside blade 26. BIOS 44 may blend boot agent code 42 and the plurality of parameters to generate boot agent 40, load boot agent 40 in memory and execute boot agent 40. In another example embodiment, boot agent code 42 may be part of BIOS 44 itself, and BIOS 44 may obtain the plurality of parameters from management application 38 via a secure connection and blend boot agent code 42 with the plurality of parameters to generate boot agent 40. Then BIOS 44 may load boot agent 40 in memory and execute boot agent 40.

In some embodiments (e.g., booting VMM 28 on blade 26), the booting can include loading VMM image 30 to a memory element of blade 26, and transferring control from boot agent 40 to VMM image 30. In other embodiments, (e.g., booting VM 16 on VMM 28), the booting can include downloading a script from provisioning server 32 through the secure channel. The script may duplicate a daemon (e.g., a process) into an initial ramdisk (initrd) in provisioning server 32. Initrd is a scheme for loading a temporary file system into memory in the boot process before mounting the real root file system. The initrd may perform hardware detection, module loading, and device discovery to get the real root file system mounted. Boot agent 40 may download the initrd to the memory element of blade 26, and modify a root file system of VMM image 30 by adding the daemon such that an agent is included in the root file system. The agent can cause a connection to provisioning server 32 through the secure channel to download VM image 36 corresponding to VM 16.

In various other embodiments, for VM creation (e.g., of VM 16), boot agent 40, from which VM 16 can boot, may be defined by VMM 28. VMM 28, following an indication of a boot policy agent in management application 38, can create boot agent 40 starting from a boot agent code 42 (which may be already present in blade 26) and adding the plurality of parameters obtained from management application 38. The "boot policy agent" refers to a method by which the configuration of boot options is propagated to various components of communication system 10. Usually, the entity responsible for configuration (e.g. customer via GUI) may generate a boot policy that is propagated using the specific boot policy agent. Boot agent 40 can create the secure channel with provisioning server 32, and download VM image 36 therefrom. VM image 36 may be booted up to instantiate VM 16 in blade 26. In other embodiments, VM 16 may be created with a vMedia boot option active so that boot agent 40 (generated from a blending of boot agent code 42 and the plurality of parameters) may be downloaded from management application 38.

In various embodiments, provisioning server 32 can authenticate blade 26, check boot requests, and verify image names. Provisioning server 32 can provide VMM image 30 and VM image 36 to blade 26 via the secure channel. Management application 38 may set up provisioning server 32 with the parameters, including: network IP address; certificate to be used with TLS protocol; public and private keys; and (for every blade it supports) blade identifier and blade server shared key.

Turning to the infrastructure of communication system 10, the network topology can include any number of switches, blade servers, blades, VMs, VMMs, provisioning servers, gateways and other nodes inter-connected to form a large and complex network. A "node" may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

In some embodiments, network 12 may include one or more network elements that integrate computing, networking, and storage at a backplane level while adding management capabilities through management application 38. As used herein, the term "network element" is meant to encompass computers, network appliances, servers, routers, switches, fabric interconnects, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Management application 38 is an application (e.g., computer program) that can run on any suitable network element configured to perform the operations described herein. For example, management application 38 may run on a fabric interconnect (e.g., Cisco UCS 6100 Series Fabric Interconnect) within switch 20 that supports several uplink and downlink connections or ports. The fabric interconnect that houses management application 38 may be bundled with one or more similar appliances for redundancy purposes. The fabric interconnect, through management application 38, may manage one or more blade servers 22. Blade servers 22 can support several blades (e.g., blade 26).

In some embodiments, blade servers 22 can be housed in a blade server chassis that supports multiple blades (e.g., eight blades). In some embodiments, the fabric interconnect hosting management application 38 may be seated on top of the blade server chassis and can be responsible for the overall management of blade servers 22. In some embodiments, switch 20 and blade servers 22 may be located in one physical enclosure (e.g., chassis). In addition to switches, blade servers, and other components illustrated in FIG. 1, network 12 can also include fabric extenders, rack-mount servers, and network adapters. In addition, various local area networks (LANs) and storage area networks (SANs) may be part of network 12. In some embodiments, the LAN or SAN may host provisioning server 32 as an application on a VM running therein.

Management application 38 may include suitable graphical user interfaces (GUIs) or command line interfaces (CLIs) to expose various functionalities to network administrators. In an example embodiment, management application 38 may expose its functions through a native Extensible Markup Language (XML) application-programming interface (API). The GUI and CLI can also use the XML API; additionally, users can create their own front-end user interfaces with the API. For example, a deployment in a multi-tenant environment can have a custom GUI for each tenant. Other implementations may use the API to connect to a configuration management database or to third-party management and provisioning tools.

Boot agent 40 is an application that executes in blade 26 to perform the operations described herein. Provisioning server 32 is an application running in a VM in a network element in the data center platform. For example, provisioning server 32 may run in another blade in blade servers 22; alternately, provisioning server 32 may run in a VM connected to network 12; alternatively, provisioning server 32 may run in another blade (apart from blade servers 22) connected to switch 20. Multiple instances of provisioning server 32 may be running at any instant in time within communication system 10. Multiple instances of provisioning server 32 could optimize download time when a plurality of blades performs bootstrapping at the same time. For example, the multiple instances can manage different blades in different chassis, optimizing the network load.

The connection between blade 26 and provisioning server 32 may be defined at the level of management application 38. For example, the connection may be through a secure channel. In some embodiments, the secure channel may be a TLS protocol channel, and the download process may be via HTTPS or secure File Transfer Protocol (FTP) over the TLS channel. The parameters for setting up the TLS channel may be provided to blade 26 and provisioning server 32 by management application 38 in some embodiments. In other embodiments, the parameters may be provided by a network administrator, and/or other management services in network 12.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration. For example, network 12 may comprise access switches, aggregation switches, and core switches to aggregate and distribute ingress (upstream traffic), and egress (downstream traffic) traffic. A plurality of switches (virtual and/or physical) may be provided at each access, aggregation, and core level to achieve redundancy within network 12. Further, network 12 may include elements particular to the type of network services provided; for example, in data centers that provide mass storage, network 12 may include SANs.

The example network environment may be configured over a physical infrastructure that may include one or more networks and, further, may be configured in any form including, but not limited to, LANs, wireless local area networks (WLANs), virtual local area networks (VLANs), metropolitan area networks (MANs), wide area networks (WANs), Virtual Private Networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, optical fiber, etc. or any suitable combination thereof. In other embodiments, communication links may represent a remote connection through any appropriate medium (e.g., digital subscriber lines (DSL), telephone lines, T1 lines, T3 lines, wireless, satellite, optical fiber, cable, Ethernet, etc. or any combination thereof) and/or through any additional networks such as wide area networks (e.g., the Internet).

Figure 2:
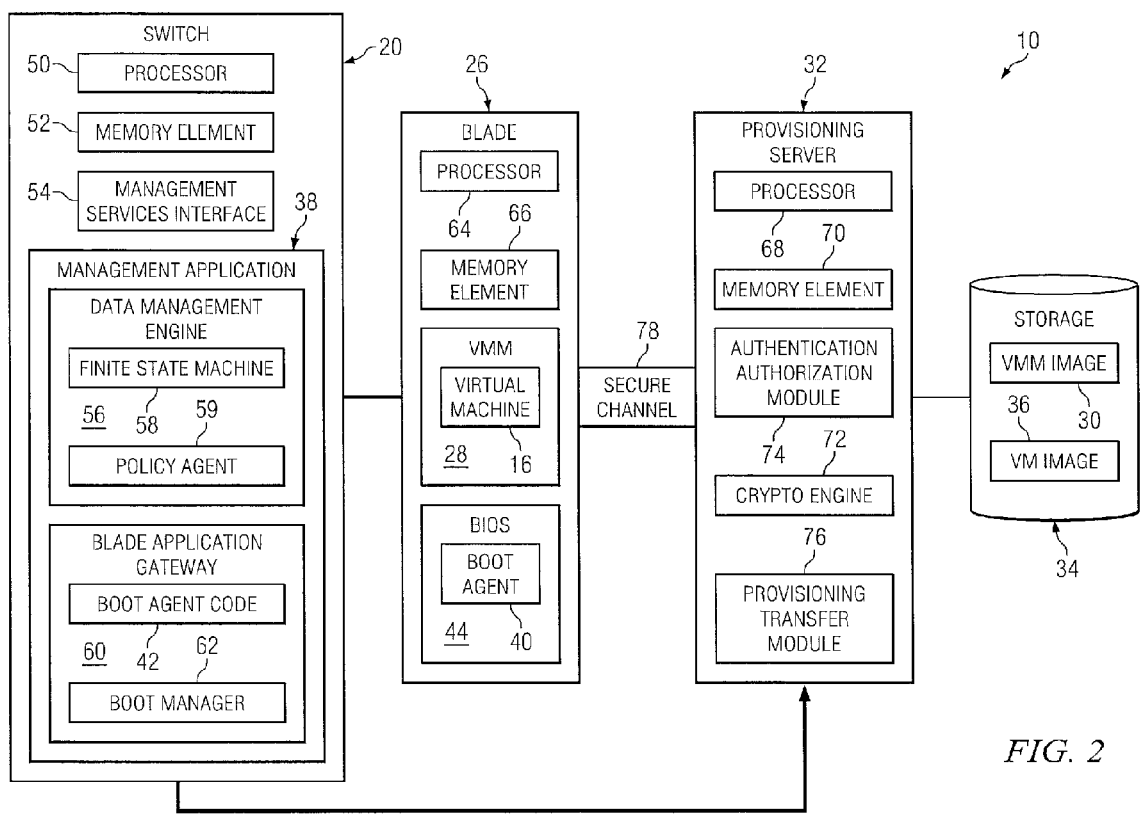
FIG. 2 is a simplified block diagram illustrating example details of the system in accordance with one embodiment.

Turning to FIG. 2, FIG. 2 is a simplified block diagram illustrating example details of an embodiment of communication system 10. Switch 20 may include a processor 50, a memory element 52, and a management services interface 54 in addition to management application 38. Management application 38 can include a data management engine (DME) 56 including a finite state machine (FSM) 58 and a policy agent 59 for facilitating secure boot. DME 56 can control a blade application gateway (AG) 60, which can customize boot agent code 42 to create boot agent 40. Blade AG 60 may also include a boot manager 62 for facilitating secure boot.

Blade 26 may include another processor 64, and another memory element 66, in addition to VMM 28 that hosts VM 16, and BIOS 44 that downloads boot agent 40. Provisioning server 32 may include yet another processor 68, yet another memory element 70, a crypto-engine 72, an authentication authorization module 74, and a provisioning transfer module 76 to facilitate booting with boot agent 40. A secure channel 78 between blade 26 and provisioning server 32 may be enabled by boot agent 40 to download and store VMM image 30 and VM image 36 from storage 34.

In various embodiments, DME 56 can be a central service that manages the components of switch 20 and blade servers 22. In various embodiments, DME 56 can store and maintain states for the managed devices and components. DME 56 can propagate configuration information, including configuration changes, to the devices and endpoints it manages, for example, in a form of managed objects (MOs). MOs can contain the desired configuration and the current state of a corresponding endpoint (e.g., blade 26). Administrators may make changes to the MOs through suitably configured APIs. The changes may be validated by DME 56 and propagated to the specific endpoint (e.g., blade 26). For example, an operator may initiate a server "power-on" request through the GUI targeted at blade 26. When DME 56 receives the request, it validates it, and if the request is valid, DME 56 makes the corresponding state change on the MO corresponding to blade 26. The state change is then propagated to blade 26 through the appropriate application gateway (e.g., blade AG 60).

Blade AG 60 can act as a hardware abstraction layer between DME 56 and the managed endpoints (e.g., blade 26). Blade AG 60 can also report the system state from the endpoints (e.g., blade 26) to DME 56. In various embodiments, blade AG 60 can convert management information (such as configuration, statistics, and faults) from its native representation into the form of MOs. Blade AG 60 can implement platform-specific details of each of the managed endpoints (e.g., blade 26). Blade AG 60 can compare the administrative state of the MOs with the operational state of the associated managed endpoint (e.g., blade 26) and take appropriate action (e.g., corrective action if there is a difference between the MOs and the endpoint state). In various embodiments, boot manager 62 may set up the environment for the network boot. For example, boot manager 62 may generate cryptographic parameters used by boot agent code 42; and boot manager 62 can configure provisioning server 32 for secure boot. Boot manager 62 can instruct provisioning server 32 to modify VMM image 30, adding a boot policy agent as daemon (e.g., using a script).

During operation, a user may decide to start VMM 28 in blade 26 and may select appropriate provisioning server 32 to obtain VMM image 30 from storage 34 using management services interface 54. In another embodiment, the decision to start VMM 28 or to select provisioning server 32 may be according to network load allocation, network administrator directives, policy, rule, etc. DME 56 may instruct boot manager 62 to prepare secure boot accordingly. Boot manager 62 may identify the appropriate image either locally (e.g., in switch 20), or by talking to a policy server (e.g., that may be located elsewhere on network 12). Boot manager 62 may generate cryptographic parameters and acquire other parameters from DME 56 as appropriate. In one embodiment, management application 38 may communicate the parameters to provisioning server 32.

Blade AG 60 may instruct blade 26 to power up. Blade 26 may power up and initiate BIOS 44. Blade AG 60 may intercept a request from BIOS 44 to obtain VMM image 30. Boot manager 62 may insert the parameters in boot agent code 42 and generate boot agent 40. Boot agent 40 may be transferred to blade 26, for example, over the physical connection between switch 20 and blade 26. In one embodiment, the transfer may be over an Ethernet connection (e.g., between switch 20 and blade 26). Boot agent 40, in blade 26, may set up secure channel 78 with provisioning server 32. In one embodiment, the parameters for setting up secure channel 78 may be provided to blade 26 and provisioning server 32 by management application 38. In some embodiments (e.g., booting VMM 28 on blade 26), boot agent 40 may request VMM image 30 from provisioning server 32. Provisioning server 32 may access storage 34, retrieve VMM image 30 and transmit VMM image 30 to boot agent 40 over secure channel 78. Boot agent 40 may cause VMM image 30 to load in memory element 66, and may transfer control thereto.

In other embodiments (e.g., booting VM 16 on VMM 28), blade 26 may be selected to start VMM 28 and VM 16, and provisioning server 32 may be selected to provide VMM image 30 and VM image 36. Management application 38 may receive a service profile from management services interface 54 with the parameters for establishing secure channel 78 and booting the desired VMM 28 and VM 16. Policy agent 59 may cause boot manager 62 to prepare for a secure boot. Boot manager 62 may resolve the image description policy either locally or by talking to the policy server. Boot manager 62 may generate (or access) the parameters, including cryptographic parameters, and a script. Boot manager 62 may instruct provisioning sever 32 to customize the initrd related to the booting process.

Boot manger 62 may also provide settings to configure provisioning server 32 appropriately. In some embodiments, the settings may be provided in the form of MOs associated with configuration settings of provisioning server 32 and the script. Provisioning server 32 may customize the initrd according to the configuration settings. In one embodiment, the script may cause the initrd to include a daemon therein. The daemon may facilitate creating an agent in the root file system for secure boot of VM image 36 later in the booting process. The agent may include information relevant to future secure boots, for example, identity of provisioning server 32, the parameters, etc.

Provisioning server 32 may get a kernel and a root file system of VMM 28 from storage 34. The kernel and root file system may be included in VMM image 30. Parameters to set up the secure channel may be exchanged between provisioning server 32 and management application 38. Boot agent code 42 may create boot agent 40 and transfer it to blade 26. Blade 26 may boot with boot agent 40. Secure channel 78 may be established between provisioning server 32 and blade 26. Boot agent 40 may be authenticated and authorized by provisioning server 32. Boot agent 40 may then download the script.

Boot agent 40 may subsequently download the kernel and the initrd, including the daemon. Boot agent 40 may load the kernel and the initrd to memory element 66. The initrd may then download the root file system from provisioning server 32. In one embodiment, the download may be using a secure shell (SSH) tunnel. The initrd may modify the downloaded root file system to add the agent. The initrd may then switch the initial root file system with the modified root file system. The agent in the modified root file system may contact management application 38, and download and use a boot policy agent. The boot policy agent may start a procedure to get VM image 36 from provisioning server 32 in a manner similar to getting VMM image 30. VMM 28 may thereupon instantiate VM 16 in blade 26.

Figure 3:
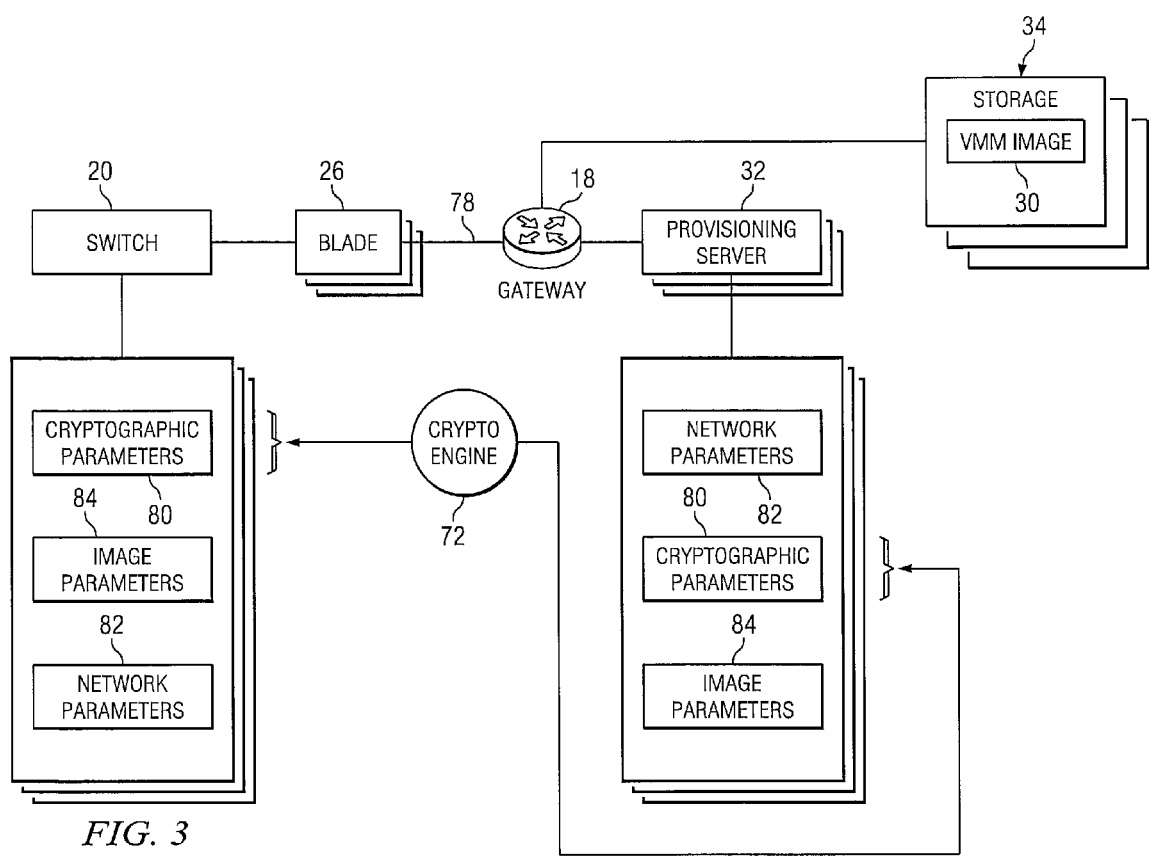
FIG. 3 is a simplified block diagram illustrating other example details of the system in accordance with another embodiment.

Turning to FIG. 3, FIG. 3 is a simplified block diagram showing additional details of communication system 10. Secure channel 78 may be established between blade 26 and provisioning server 32 through gateway 18 using parameters specific to blade 26. The parameters may be provided by switch 20 to both provisioning server 32 and blade 26. The parameters may include cryptographic parameters 80, network parameters 82, and image parameters 84. At least some cryptographic parameters 80 may be generated and/or decrypted by crypto-engine 72 in provisioning server 32. Merely as examples, and not as limitations, cryptographic parameters 80 include parameters that can be used to generate cryptographic keys and associated information, including entropy, provisioning server public key, provisioning server private key, certificate, and blade server shared key.

Entropy is a measure of the uncertainty associated with a random variable. Entropy can be random number generator seeds. For example, a pseudorandom function can be used to create a master secret for a TLS session between blade 26 and provisioning server 32. The master secret is used as a source of entropy when creating session keys for the TLS session. The provisioning server public key and provisioning server private key can be part of a secure key pair whose key pairs are mathematically linked. The public key is used to transform a message into an unreadable form, decryptable only by using the (different but matching) private key. The certificate is an electronic document that uses a digital signature to bind the public key with an identity of provisioning server 32. The blade server shared key is specific to a single blade (e.g., blade 26), shared between blade 26 and provisioning server 32, and may be used for mutual authentication and/or securing secure channel 78. Various other parameters (not listed herein) that can be used to generate cryptographic keys and associated information may be included in cryptographic parameters 80.

Merely as examples, and not as limitations, network parameters 82 include parameters that identify network elements on network 12, including blade IP address, netmask, gateway IP address, blade ID, and provisioning server IP address. Blade IP address, gateway IP address, and provisioning server IP address refer to the IP addresses of blade 26, gateway 18 and provisioning server 32, respectively. Blade ID is a unique identifier (such as a name or number) associated with blade 26, so as to differentiate it from other blades in network 12. Netmask is a 32-bit mask used to divide an IPv4 address into subnets and specify the network's available hosts. Other addressing mechanisms may be included in network parameters 82, for example, as addressing technologies evolve in the future. Various other parameters (not listed herein) that can be used to identify network elements may be included in network parameters 82.

Merely as examples, and not as limitations, image parameters 84 include parameters that identify the stateless image and associated information of VMM image 30 and VM image 36, such as name and path, kernel, kernel boot option, root file system, and image type. The kernel is a bridge between applications and hardware of the computing system on which the applications run. OS tasks may be executed differently by different kernels, depending on their respective design and implementation. For example, monolithic kernels may execute all OS code in the same address space of a memory element (e.g., 66); microkernels may run most of the OS services in user space of the memory element (e.g., 66). Moreover, different commercially available kernels may be specified as appropriate, including Inferno kernel, Windows NT kernel, SunOS kernel, NetBSD kernel, etc. Kernel boot options include the title of the OS, the name of the initrd to load, root file system, system language, console font, etc. Image types (e.g., file formats) may be open standards, such as the ISO image format for optical disc images, or proprietary to particular software applications that produce the image. Various other parameters (not listed herein) that can be used to identify and describe the image may be included in image parameters 84.

Figure 4:
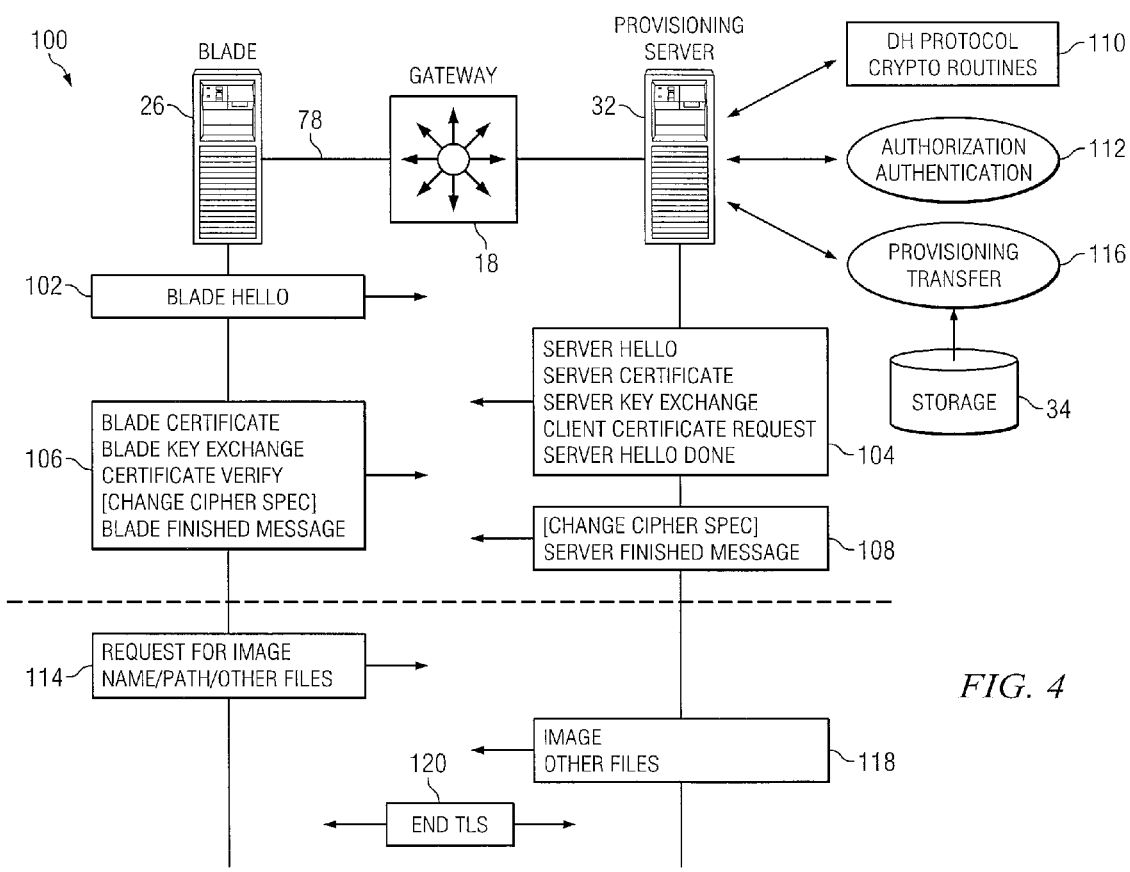
FIG. 4 is a simplified flow diagram illustrating example operations that may be associated with an embodiment of the system.

Turning to FIG. 4, FIG. 4 is a simplified block diagram illustrating example operations that may be associated with setting up secure channel 78 and downloading virtualized images securely. In one embodiment, secure channel 78 is a TLS protocol session. TLS is a cryptographic protocol that provides communication security over an unsecure network connection (e.g., Internet). TLS encrypts segments of network connections above the transport layer (e.g., application layer, presentation layer, session layer), using asymmetric cryptography for key exchange, symmetric encryption for privacy, and message authentication codes for message integrity. The TLS protocol allows client-server applications to communicate across a network in a way designed to prevent eavesdropping and tampering. Each party (e.g., blade 26 and provisioning server 32) may save session information (e.g., a session ticket, a peer's X.503 certificate, compression method, cipher specification, master secret, etc.), and connection information (e.g., server and client keys for encryption, initialization vector for the cipher, etc.) for each session until the session is terminated.

Blade 26 and provisioning server 32 may negotiate a stateful TLS connection by using a handshaking procedure with part of cryptographic parameters 80. During the handshake, blade 26 and provisioning server 32 may agree on various parameters to establish the connection's security. The handshake begins at 102 with a blade hello requesting a secure connection. The blade hello may include a list of supported cipher suites (e.g., ciphers and hash functions). From this list, provisioning server 32 may pick the strongest cipher and hash function that it also supports. Provisioning server 32 may respond to the blade hello at 104 with a server hello including its server certificate. The server certificate usually contains the server name, the trusted certificate authority, and the server's public encryption key. The server hello message may also include the chosen protocol version (e.g., TLS 1.2), a random number, cipher suite and compression method from the choices offered by the client.

At 106, blade 26 may respond with a blade certificate, and blade key exchange message, which can contain a PreMasterSecret encrypted with the server certificate. Blade 26 and provisioning server 32 may then use the random numbers and PreMasterSecret to compute a common secret, called the "master secret." All other key data for this connection may be derived from this master secret (and the generated random values), which can be passed through a pseudorandom function. Blade 26 may optionally send a ChangeCipherSpec record, and an authenticated and encrypted Finished message, over the previous handshake messages. At 108, provisioning server may attempt to decrypt and verify the Finished message, and optionally send a ChangeCipherSpec message along with its authenticated and encrypted Finished message.

At 110, to perform cryptographic computations, including generating the private keys, provisioning server 32 may use Diffie-Hellman (DH) protocol cryptographic routines, which may be provided in crypto-engine 72. At 112, authentication authorization module 74 may authorize and authenticate the handshake between blade 26 and provisioning server 32. After the handshake is done, secure channel 78 may be established for further secure communication between blade 26 and provisioning server 32. At 114, after the handshake is done, boot agent 40 in blade 26 may send a request for VMM image 30 to provisioning server 32. At 116, provisioning server 32 may perform a provisioning transfer of VMM image 30 from storage 34 using provisioning transfer module 76. At 118, provisioning server 32 may provide VMM image 30 and other associated files to blade 26. At 120, the TLS session may be ended.

Figure 5:
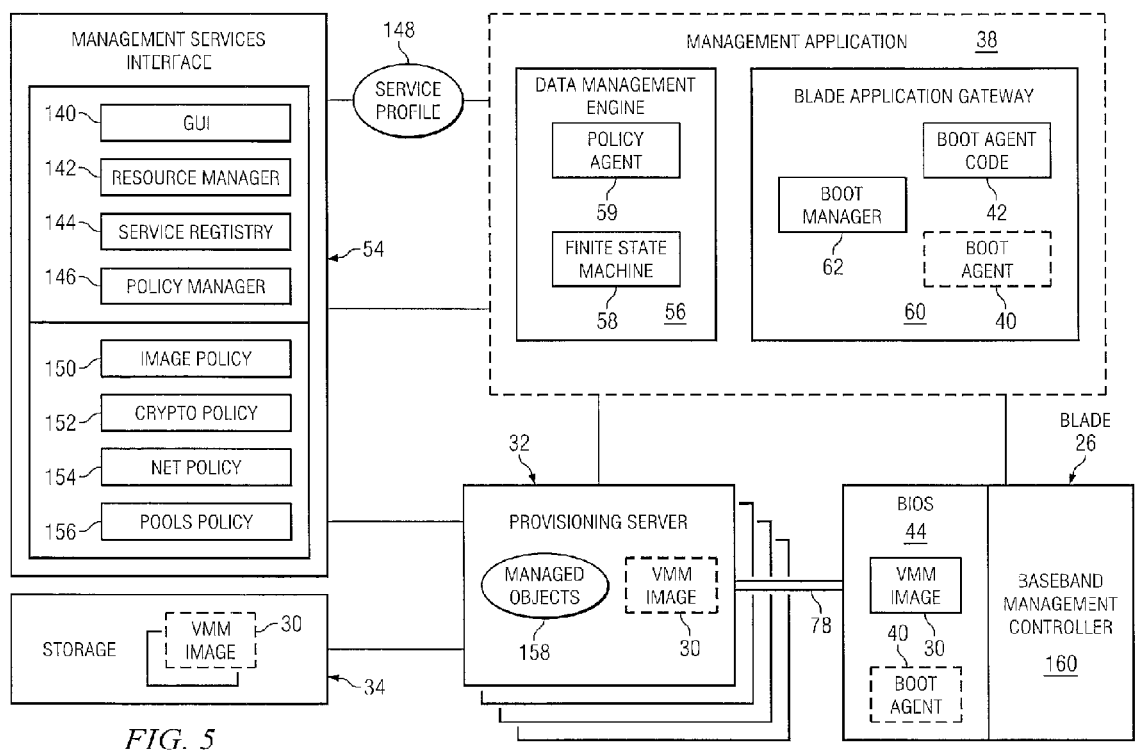
FIG. 5 is a simplified block diagram illustrating example details of an embodiment of the system.

Turning to FIG. 5, FIG. 5 is a simplified block diagram illustrating example details of an embodiment of communication system 10. Management services interface 54 may include a graphical user interface (GUI) 140, a resource manager 142, a service registry 144, and a policy manager 146. GUI 140 can permit user interactions with communication system 10, for example, for selecting VM 16 to boot on blade 26, and other such purposes. Resource manager 142 may make a placement decision (e.g., where to boot VM 16) based on constraints such as load, space, or bandwidth; caching policy; load balancing between multiple provisioning servers; and other constraints. Resource manager 142 may also instantiate provisioning server 32 and/or remove provisioning server 32 previously instantiated based on particular needs. In various embodiments, resource manager 142 can collect, display, and store data about system performance, application, or process use. For example, resource manager 142 may facilitate a service profile 148, which can manage an administrative state of blade 26.

Service profile 148 is a self-contained definition of server and connectivity configuration and identity. Service profile 148 can provide a logical description of blade 26 sufficient to enable a one-to-one relationship between service profile 148 and blade 26. Service profile 148 may contain components that define the server environment, including the local server settings. For example, service profile 148 may contain values for the blade's property settings, including virtual NICs (vNICs), Media Access Control (MAC) addresses, boot policies, firmware policies, and other elements. In various embodiments, service profile 148 may include cryptographic parameters 80, network parameters 82, and image parameters 84 for secure provisioning of VMM image 30 or VM image 36 on blade 26. In some embodiments, service profile 148 may provide boot option settings (e.g. vMedia).

Service registry 144 may organize service information (e.g., information about available business services, applications services, network services, storage services, etc.) and support interaction among network elements that provide and consume services within network 12. For example, service registry 144 may register provisioning server 32 with appropriate service profile 148 and parameters (e.g., modules information, certificates, etc.) to facilitate secure provisioning of VMM image 30 (or VM image 36) on blade 26. Service registry 144 may also issue certificates to provisioning server 32 and blade 26 as appropriate, for example, to facilitate creating secure channel 78.

Policy manager 146 may create and store various policies, which can be administrator-defined sets of rules and operating characteristics. For example purposes, and not as limitations, four policies are illustrated in the FIGURE: an image policy 150, a crypto policy 152, a net policy 154, and a pools policy 156. Image policy 150 may include specifications about an image (e.g., VMM image 30 or VM image 36, etc.) including image parameters 84; crypto policy 152 may include settings and rules associated with cryptographic parameters 80; net policy 154 may include network parameters 82; and pools policy 156 may include settings about available resource pools (e.g., blades in blade servers 22) that permit automatic selection of blades and provisioning servers based on network load demands.

Service profile 148 can be associated with blade 26 manually or automatically (e.g., using a policy or the XML API of management application 38). When service profile 148 is associated with blade 26, DME 56 can fulfill the configuration request associated with the settings specified therein. In one embodiment, a thread of the DME process, referred to as the "doer" thread, creates a service profile association workflow in the form of FSM 58. The doer thread can modify suitable MOs according to the settings in service profile 148. For example, DME 56 can propagate configuration information, including information in service profile 148 to provisioning server 32 in the form of MOs 158. MOs 158 may be created using policies 150-156 on management services interface 54. In another example, FSM 58 may call blade AG 60 to actually deploy the configuration settings to blade 26. When blade AG 60 completes its task, it signals the doer thread, at which point the doer thread transitions to the next task in FSM 58. FSM 58 may orchestrate management stimuli serially (and/or on a transaction-basis) to help ensure that requests are successfully performed.

For example, policy agent 59 may initiate a series of tasks to boot VMM image 30 on blade 26. FSM 58 may orchestrate various processes between boot manager 62 and provisioning server 32 to facilitate secure provisioning of VMM image 30 on blade 26. FSM 58 may pass parameters for creating boot agent 40 to boot manager 62, so that the parameters may be written to a copy of boot agent code 42 to generate boot agent 40. Blade 26 can include a baseband management controller (BMC) 160 that may provide environmental monitoring of blade 26. BMC 160 can integrate with management application 38 (e.g., through the XML API) to provision and configure blade 26.

During operation, resource manager 142 may generate (or retrieve) service profile 148. Service profile 148 may include information about blade 26. In some embodiments, service profile 148 may include substantially all cryptographic parameters 80, network parameters 82, and image parameters 84. In other embodiments, service profile 148 may include some of cryptographic parameters 80, network parameters 82, and image parameters 84, sufficient for management application 38 to generate the remaining parameters. DME 56 may create FSM 58 and associate service profile 148 with blade 26 and provisioning server 32. Provisioning server 32 may create MOs 158 by using policies (e.g., 150-156) on management services interface 54.

FSM 58 may instruct blade 26 through blade AG 60 to power up and initiate BIOS 44. BIOS 44 may generate a request for VMM image 30. Blade AG 60 may intercept the request and cause boot manager 62 to create boot agent 40 from boot agent code 42. Boot manager 62 may obtain cryptographic parameters 80, network parameters 82, and image parameters 84 from FSM 58. In another embodiment, boot manager 62 may generate some of the cryptographic parameters 80, network parameters 82, and image parameters 84. Boot manager 62 may write cryptographic parameters 80, network parameters 82, and image parameters 84 to boot agent code 42 to generate boot agent 40.

Blade AG 60 may transfer boot agent 40 from management application 38 to blade 26. Blade 26 may load boot agent code 42 in BIOS 44. Boot agent 40 may initiate and establish secure channel 78 with provisioning server 32. Provisioning server 32 may retrieve VMM image 30 from storage 34 and store it temporarily in provisioning server 32. VMM image 30 from provisioning server 32 may be transferred to blade 26 over secure channel 78. Blade 26 may store VMM image 30 in blade 26 (e.g., in a hard disk drive). Boot agent 40 may load VMM image 30 into memory element 66 and transfer control thereto.

Figure 6:
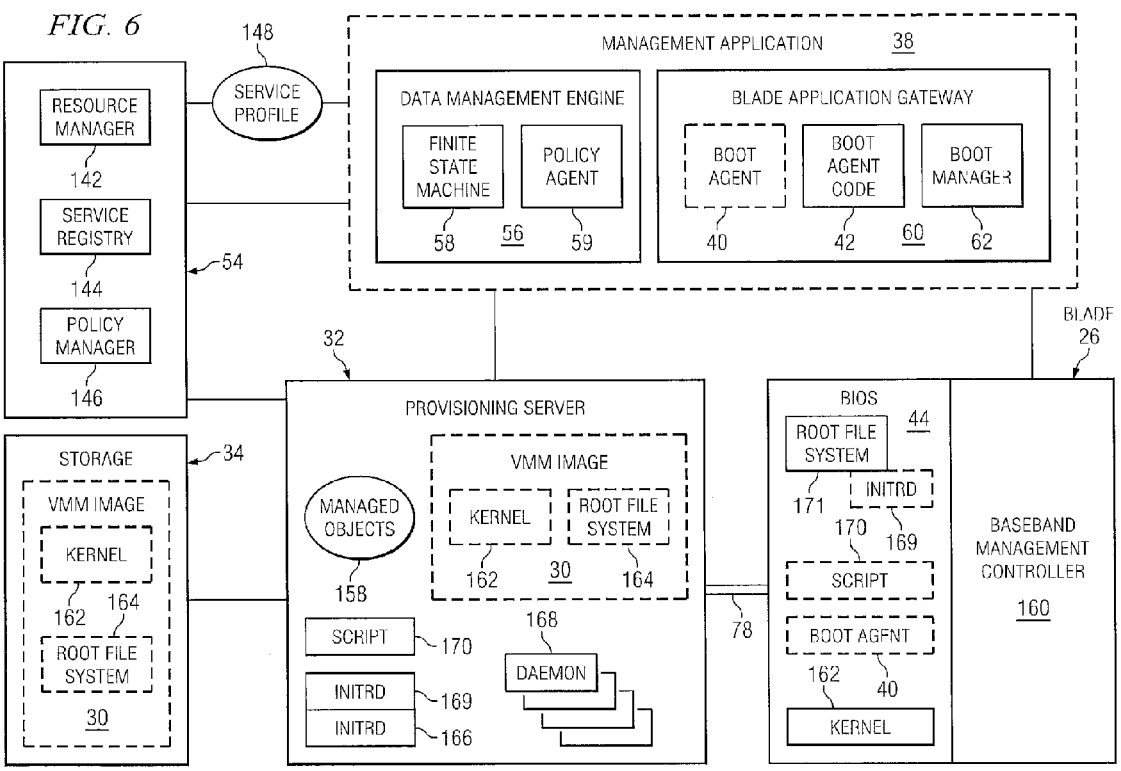
FIG. 6 is a simplified block diagram illustrating yet other example details of another embodiment of the system.
Figure 7:
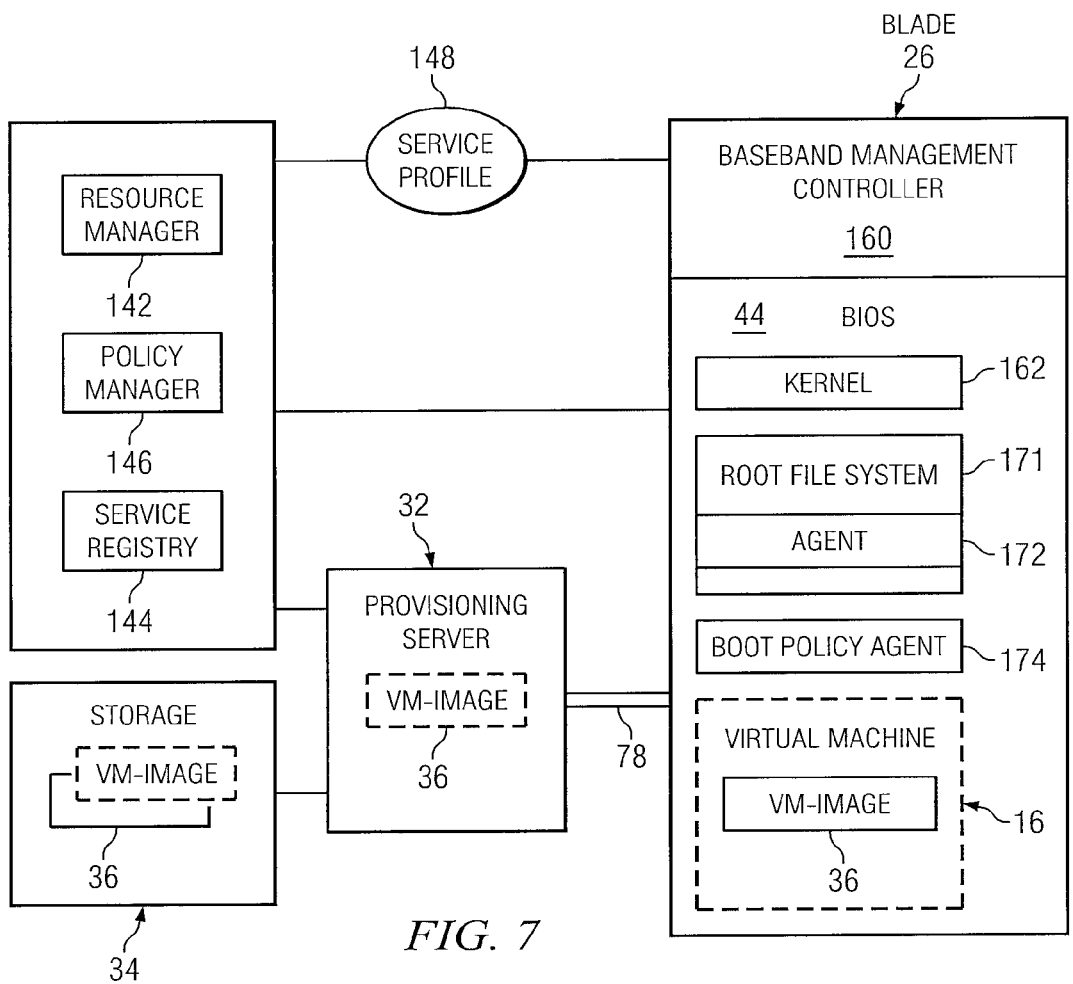
FIG. 7 is a simplified block diagram illustrating yet other example details of another embodiment of the system.

Turning to FIGS. 6 and 7, FIGS. 6 and 7 are simplified block diagrams illustrating details of an embodiment of communication system 10 for instantiating VM 16 on blade 26 using a customized VMM boot process. VMM 28 may be initially installed with a daemon that, once installed on blade 26, can communicate with management application 38. The daemon can obtain the plurality of parameters to be used with a local boot agent code 42 to generate boot agent 40 for downloading VM image 36. VMM image 30 may be stored in storage 34 and include a kernel 162 and a root file system 164. As used herein, a "root file system" is a set of files upon which the root directory can be mounted. The set of files includes files necessary to bring the blade (e.g., blade 26) to a state where other file systems can be mounted and user space daemons and applications started. In a general sense, the directory structure for a root file system can be minimal. For example, root file system 164 can contain a typical set of directories such as /dev, /bin, /etc, /sbin, among others, in a Linux OS.

Provisioning server 32 may include an initrd 166 and a daemon 168. As used herein, a "daemon" is a background process that performs actions (e.g., modifying a root file system) without user interaction. In a general sense, a daemon is not tied to a specific user, or blade. A script 170 may be provided in provisioning server 32 to create another initrd 169 that includes an instance of daemon 168. As used herein, a "script" is a small program (e.g., up to a few thousand lines of code) that executes a specific task (e.g., duplicating daemon 168 in initrd 166 to create initrd 169). According to an embodiment of communication system 10, boot manager 62 may create script 170 and transfer it to provisioning server 32. In another embodiment, provisioning server 32 may generate script 170.

During operation, service profile 148 may include information useable to generate script 170. The information from service profile 148 may be provided to provisioning server 32 by management application 38. Boot manager 62 may generate boot agent 40 from boot agent code 42 according to the parameters (e.g., cryptographic parameters 80, network parameters 82 and image parameters 84) provided in service profile 148. Boot agent 40 may be transferred to blade 26 and saved therein. Boot agent 40 in blade 26 may establish secure tunnel 78 with provisioning server 32 and request VMM image 30. Provisioning server 32 may retrieve VMM image 30 from storage 34 and store it temporarily. Provisioning server 32 may transfer script 170, kernel 162 and initrd 169 to blade 26. Boot agent 40 in blade 26 may thereafter boot kernel 162 with initrd 169. Initrd 169 may download root file system 164 from provisioning server 32 over secure channel 78. Initrd 169 may thereafter modify root file system 164 to create root file system 171. Thereafter, initrd 169 may switch itself with modified root file system 171.

Turning to FIG. 7, initrd 169 may modify root file system 164 by inserting therein an agent 172. As used herein, an "agent" is a background process that performs actions (e.g., downloading VM image 36) on behalf of a user or blade (e.g., blade 26). In a general sense, the agent differs from the daemon in that the agent can have limited user interactions (e.g., display a GUI) while the daemon cannot. Agent 172 may be a copy of daemon 168 in some embodiments. In other embodiments, agent 172 may be a modified version of daemon 168.

According to one embodiment, after the root is switched to root file system 171, agent 172 may contact management application 38 and download a boot policy agent 174. In another embodiment, boot policy agent 174 may be a part of agent 172. In yet another embodiment, boot policy agent 174 may be generated by agent 172 and/or script 170 in blade 26. Boot policy agent 174 may contact provisioning server 32 over secure channel 78 to boot VM 16. In one embodiment, communication between boot policy agent 174 and provisioning server 32 may be over HTTPS, and mutual authentication may be achieved using certificates signed by service registry 144. Provisioning server 32 may retrieve VM image 36 stored in storage 34 and save it temporarily in provisioning server 32. Boot policy agent 174 may download VM image 36 to blade 26 and mount it. VMM 28 may boot VM image 36 in blade 26 and instantiate VM 16.

In some embodiments, boot policy agent 174 may contact provisioning server 32 after receiving instructions from management application 38 based on service profile 148. For example, after VMM 28 has been loaded on blade 26, client 14 may decide to instantiate VM 16 thereon. Resource manager 142 may create service profile 148 with appropriate parameters, including image parameters 84, which reference the VM image name and path. Boot policy agent 174 may obtain the relevant parameters, including image parameters 84, from blade AG 60 and contact provisioning server 32 to download VM image 36.

Figures 8, 9:
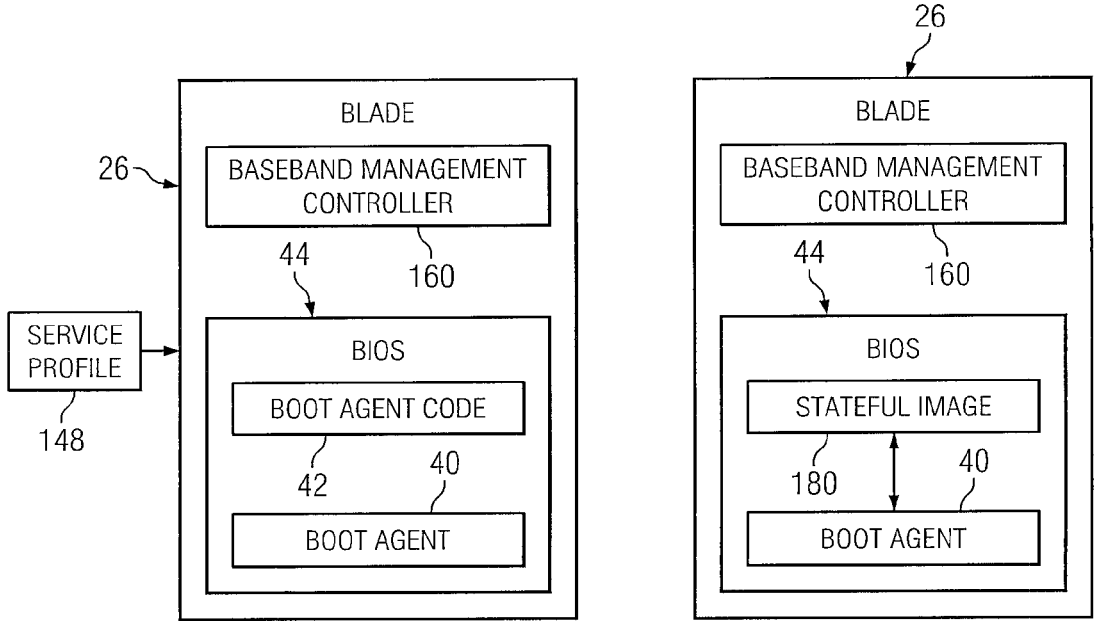
FIG. 8 is a simplified block diagram illustrating yet other example details of another embodiment of the system.
FIG. 9 is a simplified block diagram illustrating yet other example details of another embodiment of the system.

Turning to FIG. 8, FIG. 8 is a simplified block diagram illustrating another example embodiment of communication system 10. In the embodiment shown, boot agent code 42 may be provided in blade 26, instead of blade AG 60. Service profile 148 may include a block comprising the parameters, including cryptographic parameters 80, network parameters 82, and image parameters 84. Boot agent code 42 in blade 26 may access service profile 148 and generate boot agent 40 within blade 26 (instead of management application 38). Security and linearity of the operation may be enhanced, and the number of operations in the bootstrap may be accordingly reduced.

Turning to FIG. 9, FIG. 9 is a simplified block diagram illustrating yet another embodiment of communication system 10. Boot agent 40 and the parameters, including cryptographic parameters 80, may be used to enhance the security for stateful bootstraps. Boot agent 40 may check portions of code running in a stateful image 180 in blade 26. For example, boot agent 40 could seek malware modifications of stateful image 180. This method could present advantages with respect to existing methodologies (e.g., Intel® BIS or Trusted Platform Module) because it could be easily customizable: both in terms of code and parameters.

Figure 10:
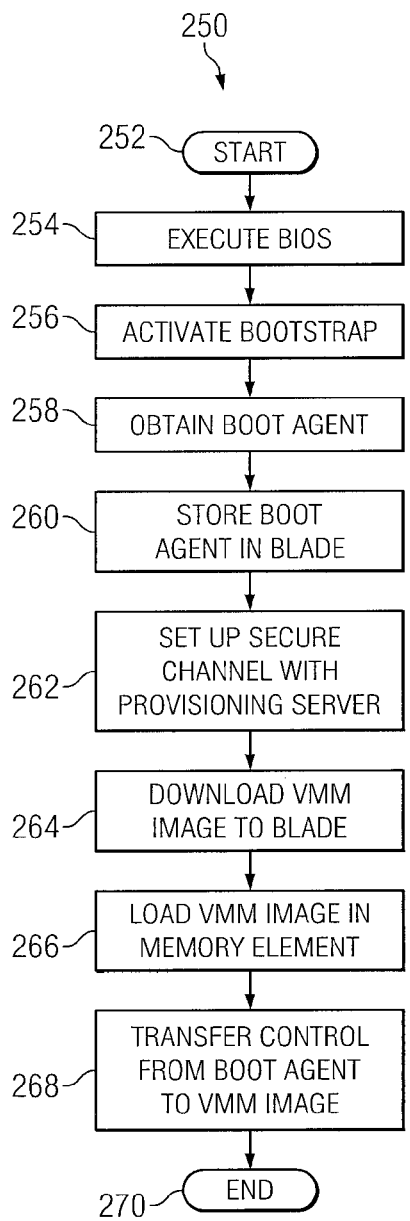
FIG. 10 is a simplified flow diagram illustrating example operations that may be associated with embodiments of the system.

Turning to FIG. 10, FIG. 10 is a simplified flow diagram illustrating example operational steps that may be associated with an embodiment of blade 26. Operations 250 may start at 252, when blade 26 is powered on. At 254, blade 26 may execute BIOS 44. At 256, BIOS 44 may activate bootstrap. At 258, BIOS 44 may obtain boot agent 40 from management application 38. At 260, blade 26 may store boot agent 40 and load it in BIOS 44. At 262, boot agent 40 may set up secure channel 78 with provisioning server 32. At 264, boot agent 40 may download VMM image 30 to blade 26. At 266, boot agent 40 may load VMM image 30 in memory element 66. At 268, boot agent 40 may transfer control to VMM image 30. The operations may end at 270.

Figure 11:
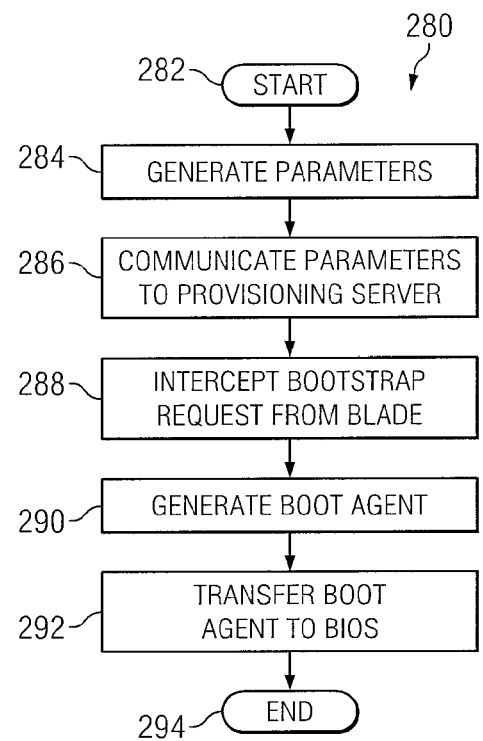
FIG. 11 is a simplified flow diagram illustrating other example operations that may be associated with embodiments of the system.

Turning to FIG. 11, FIG. 11 is a simplified flow diagram illustrating example operational steps that may be associated with an embodiment of management application 38. Operations 280 may start at 282, when management application 38 receives service profile 148. At 284, management application 38 may generate the parameters, including cryptographic parameters 80, network parameters 82, and image parameters 84. At 286, management application 38 may communicate the parameters to provisioning server 32. At 288, management application 38 may intercept a bootstrap request from blade 26. At 290, using the parameters, management application 38 may generate boot agent 40 from boot agent code 42. At 292, management application 38 may transfer boot agent 40 to blade 26. The operations may end at 294.

Figure 12:
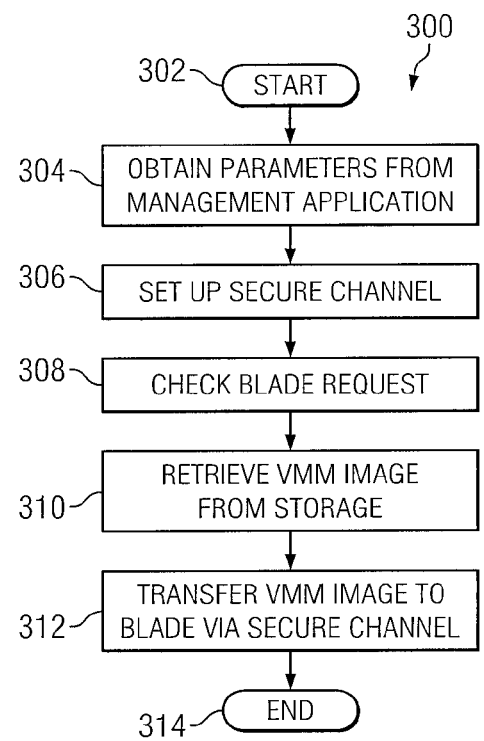
FIG. 12 is a simplified flow diagram illustrating yet other example operations that may be associated with embodiments of the system.

Turning to FIG. 12, FIG. 12 is a simplified flow diagram illustrating example operational steps that may be associated with an embodiment of provisioning server 32. Operations 300 may start at 302, when provisioning server 32 is activated. At 304, provisioning server 32 may obtain parameters, including cryptographic parameters 80, network parameters 82, and image parameters 84, from management application 38. At 306, provisioning server 32 may set up secure channel 78 with blade 26. At 308, provisioning server 32 may check a blade request for VMM image 30. At 310, provisioning server 32 may retrieve VMM image 30 from storage 34. At 312, VMM image 30 may be transferred to blade 26 via secure channel 78. The operations may end at 314.

Turning to FIG. 13, FIG. 13 is a simplified flow diagram illustrating example operational steps that may be associated with another embodiment of provisioning server 32. Initially, VMM 28 may be customized with a daemon. Provisioning server 32 may modify initrd 166 and root file system 164 appropriately. Then VMM 28 may be deployed to blade 26. At this point, management application 38 may request a VM deployment, contacting the daemon, and providing information about the plurality of parameters for VM instantiation. Operations 350 may start at 352, when provisioning server 32 is activated. At 354, provisioning server 32 may obtain parameters, including cryptographic parameters 80, network parameters 82, and image parameters 84, from management application 38. At 356, provisioning server 32 may set up secure channel 78 with blade 26.

At 358, provisioning server 32 may check a blade request for VMM image 30 that can support a secure VMM image 30 download. At 360, provisioning server 32 may retrieve kernel 162 and root file system 164 from storage 34. At 362, provisioning server 32 may create initrd 169 by duplicating daemon 168 into initrd 166. At 364, provisioning server 32 may transfer script 170, kernel 162, and initrd 169 to blade 26 via secure channel 78. At 366, provisioning server 32 may transfer root file system 164 to blade 26 via secure channel 78. In some embodiments, transfer of root file system 164 may be through SSH tunneling. At 368, provisioning server 32 may check an agent request from boot policy agent 174 for VM image 36. At 370, provisioning server 32 may retrieve VM image 36 from storage 34. At 372, provisioning server 32 may transfer VM image 36 to VMM 28 in blade 26. The operations may end at 374.

Turning to FIG. 14, FIG. 14 is a simplified flow diagram illustrating example operational steps that may be associated with another embodiment of blade 26. Operations 400 may start at 402, when blade 26 is powered on. At 404, blade 26 may execute BIOS 44. At 406, blade 26 may activate bootstrap. At 408, blade 26 may obtain boot agent 40 from management application 38. At 410, boot agent 40 may be stored in blade 26. At 412, boot agent 40 may set up secure channel 78 with provisioning server 32. At 414, boot agent 40 may download kernel 162, script 170, and initrd 169 from provisioning server 32. At 416, boot agent 40 may mount kernel 162 and initrd 169 in memory element 66. At 418, initrd 169 may download root file system 164 from provisioning server 32. At 420, initrd 169 may modify root file system 164 to include agent 172 and generate root file system 171. At 422, agent 172 may set up boot policy agent 174, which may download VM image 36 from provisioning server 32. At 424, VMM 28 may boot VM image 36 to instantiate VM 16 in VMM 28. The operations may end at 426.

Figure 15:
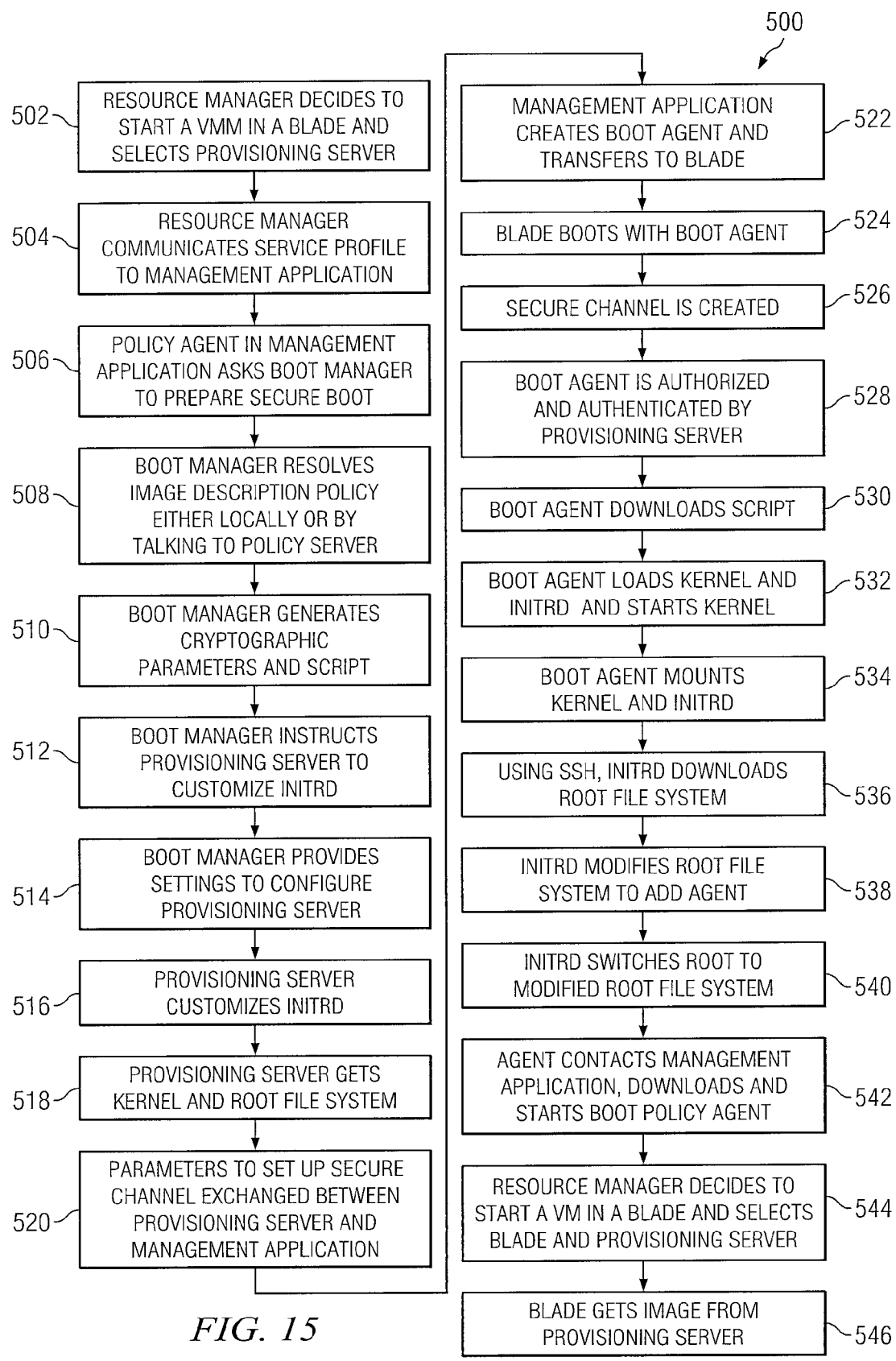
FIG. 15 is a simplified flow diagram illustrating yet other example operations that may be associated with embodiments of the system.

Turning to FIG. 15, FIG. 15 is a simplified flow diagram illustrating example operational steps that may be associated with an embodiment of communication system 10. Operations 500 include 502, where resource manager 142 decides to start VMM 28 in blade 26 and selects provisioning server 32. At 504, resource manager 142 communicates service profile 148 to management application 38. At 506, policy agent 59 in management application 38 asks boot manager 62 to prepare secure boot. At 508, boot manager 62 resolves the image description policy either locally (e.g., in switch 20) or by talking to a policy server in network 12.

At 510, boot manager 62 generates cryptographic parameters 80 and script 170. At 512, boot manager 62 instructs provisioning server 32 to customize initrd 166. At 514, boot manager 62 provides settings (e.g., through MOs 158) to configure provisioning server 32. At 516, provisioning server 32 customizes initrd 166 to include daemon 168, and generates initrd 169. At 518, provisioning server 32 gets kernel 162 and root file system 164 from storage 34. At 520, parameters (e.g., cryptographic parameters 80, network parameters 82, and image parameters 84) to set up secure channel 78 are exchanged between provisioning server 32 and management application 38. At 522, management application 38 creates boot agent 40 using boot agent code 42 and transfers boot agent 40 to blade 26.

At 524, blade 26 boots with boot agent 40. At 526 secure channel 78 is created between provisioning server 32 and blade 26. At 528, boot agent 40 is authenticated and authorized by provisioning server 32 (e.g., as part of setting up secure channel 78). At 530, boot agent 40 downloads script 170 from provisioning server 32. At 532, boot agent 40 loads kernel 162 and initrd 169 from provisioning server 32 and starts kernel 162. At 534, boot agent 40 mounts kernel 162 and initrd 169. At 536, using SSH, initrd 69 downloads root file system 164 from provisioning server 32. At 538, initrd 169 modifies root file system 164 to modified root file system 171. At 540, initrd 169 switches the root to modified root file system 171. At 542, agent 172 contacts management application 38, and agent 172 thereupon downloads, and starts boot policy agent 174. At 544, resource manager 142 decides to start VM 16 in blade 26 and selects blade 26 and provisioning server 32. At 546, blade 26 gets VM image 36 from provisioning server 32.

Figure 16:
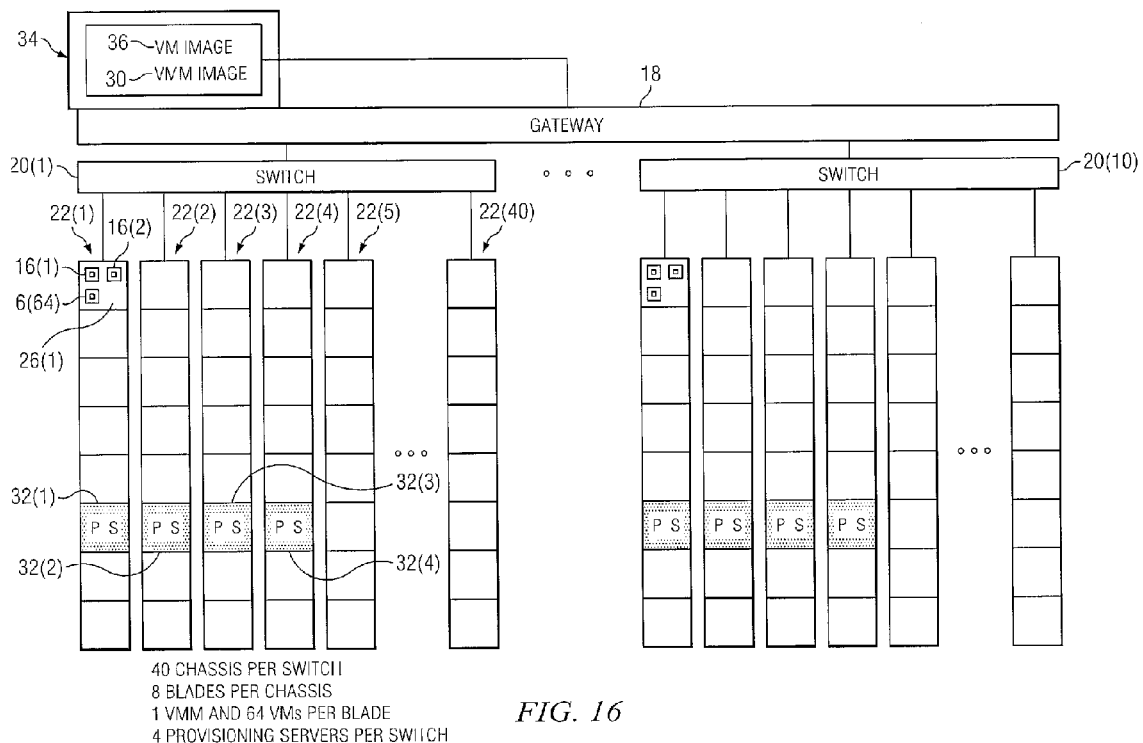
FIG. 16 is a simplified diagram illustrating an example experimental implementation of the system.

Turning to FIG. 16, FIG. 16 is a simplified block diagram illustrating an experimental implementation to simulate certain functionalities of communication system 10. Gateway 18 was connected to storage 34, including VMM image 30 and VM image 36. Gateway 18 was also connected to ten switches 20(1)-20(10), and each switch connected to 40 blade servers 22(1)-22(40). Each of blade servers 22(1)-22(40) included up to eight blades per chassis representing a total of 320 blades for each of switches 20(1)-20(10). Each blade (e.g., 26(1)) had up to 64 VMs (e.g., VM 16(1)-16(64)) to be installed thereon. A portion of blade servers 22(1)-22(40) on each of switches 20(1)-20(10) included provisioning servers 32(1)-32(4) implemented as VMs in appropriate blades therein.

In the simulation, gateway 18 included a Cisco Nexus 7000 switch, connected to several Cisco UCS 6140XP 40-Port Fabric Interconnects with support for up to 320 servers or 40 chassis as a single seamless system. Blade servers 22(1)-22(40) included a Cisco UCS 2100 Series Fabric Extender with a 10 Gbps connection between the Fabric Extender and the 6140 Fabric Interconnect. Blade servers (e.g., 22(1)-22(40)) included Cisco UCS 5100 Series Blade server chassis housing (at least eight half-width blades per chassis). Each blade had a 10 Gbps Ethernet link to the 2100 Series Fabric Extender. The Nexus 7000 switch accessed VMM image 30 and VM image 36 via 10 Gbps communication links. Each VMM image 30 was up to 4 GB in size. Provisioning servers 32(1)-32(4) were managed by a single management application 38.

According to the simulation, provisioning servers 32(1)-32(4) were downloaded and installed on blade servers 22(1)-22(4). Subsequently, VMM image 30 and VMM image 36 were downloaded by each of provisioning servers 32(1)-32(4), cached locally, and distributed to appropriate blades as bare metal software or VM software. Each of provisioning servers 32(1)-32(4) was a few megabytes in size. The total time to download each of provisioning servers 32(1)-32(4) depended on how many copies were deployed in the simulation. The time to deploy four provisioning servers 32(1)-32(4) was negligible compared to the download time of deploying several thousand instances of VMMs and VMs.

Provisioning servers 32(1)-32(4) started appropriate blades in blade servers 22(1)-22(40) with VMM image 30. Likewise, provisioning servers in the other blade servers connected to switches 20(2)-20(10) were also powered on simultaneously. An assumption in the experiment was that every blade started up with the same VMM. In the experimental implementation (with 40 chassis, each with 8 blades) one instance of provisioning server 32(1), with a VMM image size of 4 GB, would have taken 17 minutes to fully populate 320 blades, 11 minutes to populate 200 blades and 5 minutes to populate 100 blades in blade servers 22. After respective VM Ms were installed on the blades, each blade set up the virtual environment consisting of VMs on top of the VMM. The experimental implementation assumed that each blade created 64 VMs for a total of 20480 VMs for a fully populated system. The experimental implementation assumed that the 20480 VMs requested VM image 36 at the same time.

In the simulation, three variations in VM image 36 were considered: VM image 36 including 1000 separate images (each image corresponding to a specific operating system or application); VM image 36 including 2000 separate images; and VM image 36 including 5000 separate images. Each of such separate images was assumed to be 4 GBytes. To speed up the process of delivering the images to the blades, multiple provisioning servers 32(1)-32(4) were used. Each of provisioning servers 32(1)-32(4) downloaded VM image 36 locally and cached the constituent images. It was found that increasing the number of separate images in VM image 36 increased the time to complete the operation for provisioning servers 32(1)-32(4) because the images came from a single repository that serialized the operations. Subsequently, the separate images comprising VM image 36 were delivered to the blades in blade servers 22(1)-22(40).

The simulation indicated that increasing the number of provisioning servers (e.g., using provisioning servers 32(1)-32(4)) decreased the time to complete system boot, including booting VMM 28 and VM 16. For example, with one image comprising VM image 36, the time to complete booting of 20480 VMs with provisioning servers 32(1)-32(4) was 190 minutes. In addition, the time to complete booting of 6400 VMs with provisioning servers 32(1)-32(4) was 90 minutes, indicating a proportional relationship between boot time and total number of images (i.e., the time to boot increased with increasing number of images). If no provisioning servers had been used (i.e., VM image 36 downloaded directly from storage 34), the time taken to download all 20480 images was measured to be 5400 minutes. Because each chassis has its own network connection and the congestion on a single line decreased as the number of provisioning servers increased, the time to download VM image 36 to provisioning servers 32(1)-32(4) was lower than the time to download the images to corresponding blades in blade servers 22(1)-22(40).

Separately, it was found that as the number of separate images in VM image 36 increased, the time to download VM image 36 to provisioning servers 32(1)-32(4) also increased as each of provisioning servers 32(1)-32(4) downloaded and cached a copy of VM image 36 containing thousands of separate images. On the contrary, the time to install VM image 36 from each of provisioning servers 32(1)-32(4) to appropriate blades depended only on the number of separate images (and not on the number of provisioning servers 32). In particular, for the specific experimental implementation shown in FIG. 16, it was observed that having more than four provisioning servers to deliver a large number of separate images to 20000 VMs was not convenient.

Figures 17A, 17B:
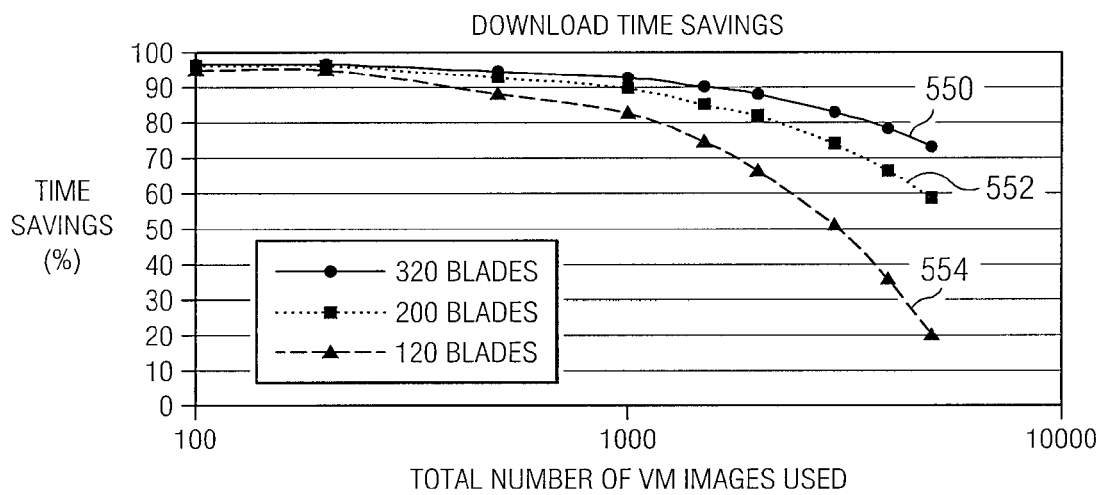
FIG. 17A is a table providing measurements from the example experimental implementation of the preceding FIGURE.
FIG. 17B is a graph illustrating the measurements from the example experimental implementation.

Turning to FIGS. 17A and 17B, FIG. 17A 17B illustrate results from the experimental setup described in connection with previous FIG. 16. Provisioning servers 32(1)-32(4) communicated with up to 320 blades with 64 VMs per blade. Each provisioning server 32 served up to 1000 connections. Up to 5000 separate images were included in VM image 36 and booted on the blades. The time to boot the images was measured. With no provisioning servers (e.g., using ISO download PXE booting process), the "baseline" measurement indicated 5400 minutes to boot 20480 VMs (corresponding to one image each on 64 VMs in 320 blades); 3400 minutes to boot 12800 VMs and 1700 minutes to boot 6400 VMs. With 1000 images per VM image 36, the time to boot for 20480 VMs, 12800 VMs and 6400 VMs, respectively, were: 400 minutes, 345 minutes, and 300 minutes, representing a 92% time savings, 90% time savings and 82% time savings from the baseline. A similar pattern may be observed for 2000 images, and 5000 images. However, the percentage timesavings may decrease with increasing number of images downloaded.

FIG. 17B is a graphical representation of the tabular results shown in FIG. 17A. Line 550 represents the percentage timesavings with 320 blades; line 552 represents the percentage time savings with 200 blades and 554 represents the percentage timesavings with 120 blades. The vertical axis of the graph reports the percentage of time saved using provisioning servers 32(1)-32(4) compared to the "baseline" measurement (e.g., one image on each VM):

$$\% \ T_{i,v} = \frac{TB_v - (T_1 + T_2)_{i,v}}{TB_v} \times 100$$

where $\% \ T_{i,v}$ corresponds to the percentage time savings to boot i images (e.g., 2000 images) and v number of VMs (e.g., 20480 VMs); $TB_v$ corresponds to the baseline time to boot v number of VMs; $T_1$ corresponds to the time to download VM image 36 to provisioning server (e.g., 32(1)-32(4)) from storage 34; and $T_2$ corresponds to the time to download and boot VM image 36 from provisioning server 32 on the blades in blade servers (e.g., 22(1)-22(40)).

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Moreover, it is imperative to note that the various modules illustrated in the FIGURES (e.g., management application 38, boot manager 62, etc.) may be moved around within communication system 10 as appropriate and provisioned in one or more network elements based on particular needs. The logical representation of the various modules presented herein is merely for example purposes and is not intended to serve as limitations. Various configurations other than those presented herein are possible to achieve the functionalities described in this Specification. For example, boot manager 62 may be provisioned separately from management application 38 within a physical switch (e.g., Cisco Nexus 7000), whereas management application 38 (without boot manager 62) may be provisioned in a Fabric Interconnect (e.g., Cisco UCS 6140XP 40-Port Fabric Interconnect), physically separated from the physical switch hosting boot manager 62. In another example, provisioning server 32 may be hosted as another VM in blade 26.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, blade 26, and switch 20. In some embodiments, one or more of these features may be implemented in hardware, provided external to these elements, or consolidated in any appropriate manner to achieve the intended functionality. The various network elements (e.g., management application 38, boot agent 40, provisioning server 32) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, management application 38, boot agent 40, and provisioning server 32 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory elements 52, 66, 70) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., 50, 64, 68) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., 52, 66, 70) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    setting up, by a boot agent executing in a blade, a secure channel between the blade and a provisioning server in a network environment, wherein the blade and the provisioning server are mutually authenticated and authorized with a plurality of parameters wherein the boot agent is obtained from a management application executing in a switch providing network connectivity to the blade;
    downloading an image of a virtual machine monitor (VMM) from the provisioning server to the blade through the secure channel, wherein the VMM is capable of hosting a plurality of virtual machines (VMs) on the blade;
    intercepting, at the switch, a boot request from a basic input/output system (BIOS) of the blade; and
    booting the image to instantiate the VMM on the blade.

2. The method of claim 1, wherein the booting comprises: loading the image on a memory element of the blade; and transferring control to the image.

3. The method of claim 1, wherein the booting comprises:
    modifying a root file system of the image by adding a daemon such that an agent is included in the root file system, wherein the agent can cause a download of another image corresponding to a virtual machine from the provisioning server.

4. The method of claim 3, wherein the agent is configured to create a boot policy agent that can contact the provisioning server to obtain the another image.

5. The method of claim 1, wherein the plurality of parameters comprises image parameters, cryptographic parameters and network parameters, wherein the image parameters comprise an image name and path, a kernel, a kernel boot option, a root file system, and an image type, wherein the cryptographic parameters include an entropy, a provisioning server public key, a provisioning server private key, a certificate, and a blade server shared key, and wherein the network parameters include a blade Internet Protocol (IP) address, a netmask, a gateway IP address, a blade identifier (ID), and a provisioning server IP address.

6. The method of claim 1, wherein the secure channel is set up using a transport layer security (TLS) protocol.

7. The method of claim 1, wherein the image is downloaded using a HyperText Transfer Protocol Secure (HTTPS) protocol.

8. The method of claim 1, wherein at least a portion of the plurality of parameters are retrieved from a switch managing the blade.

9. The method of claim 1, further comprising:
    customizing a boot agent code with the plurality of parameters to generate the boot agent, wherein the boot agent code is valid for substantially all blades in a blade server; and
    transferring the boot agent to the blade in response to the boot request.

10. The method of claim 9, wherein the transferring of the boot agent is performed over a physical connection, the physical connection being a selected one of a group of physical connections, the group consisting of: a) an Ethernet connection; b) an optical fiber connection; and c) a non-Ethernet connection.

11. Logic encoded in non-transitory media that includes instructions for execution and when executed by a processor, is operable to perform operations comprising:
    setting up, by a boot agent executing in a blade, a secure channel between the blade and a provisioning server in a network environment, wherein the blade and the provisioning server are mutually authenticated and authorized with a plurality of parameters* wherein the boot agent is obtained from a management application executing in a switch providing network connectivity to the blade;
    downloading an image of a VMM from the provisioning server to the blade through the secure channel, wherein the VMM is capable of hosting a plurality of virtual machines (VMs) on the blade;
    intercepting, at the switch, a boot request from a BIOS of the blade; and
    booting the image to instantiate the VMM on the blade.

12. The logic of claim 11, wherein the booting comprises:
    modifying a root file system of the image by adding a daemon such that an agent is included in the root file system, wherein the agent is configured to download another image corresponding to a virtual machine from the provisioning server.

13. The logic of claim 11, wherein the booting comprises: loading the image on a memory element of the blade; and transferring control to the image.

14. The logic of claim 11, wherein the secure channel is set up using a TLS protocol.

15. The logic of claim 11, further comprising:
    customizing a boot agent code with the plurality of parameters to generate the boot agent, wherein the boot agent code is valid for substantially all blades in a blade server; and
    transferring the boot agent to the blade in response to the boot request.

16. An apparatus, comprising:
    a non-transitory hardware memory element for storing data; and a hardware processor that executes instructions associated with the data, wherein the hardware processor and the non-transitory hardware memory element cooperate such that the apparatus is configured for:
    setting up, by a boot agent executing in a blade, a secure channel between the blade and a provisioning server in a network environment, wherein the blade and the provisioning server are mutually authenticated and authorized with a plurality of parameters* wherein the boot agent is obtained from a management application executing in a switch providing network connectivity to the blade;
    downloading an image of a VMM from the provisioning server to the blade through the secure channel, wherein the VMM is capable of hosting a plurality of virtual machines (VMs) on the blade; intercepting, at the switch, a boot request from a BIOS of the blade;

intercepting, at the switch, a boot request from a BIOS of the blade; and booting the image to instantiate the VMM on the blade.

17. The apparatus of claim 16, wherein the booting comprises: modifying a root file system of the image by adding a daemon such that an agent is included in the root file system, wherein the agent is configured to download another image corresponding to a virtual machine from the provisioning server.

18. The apparatus of claim 16, wherein the plurality of parameters comprises image parameters, cryptographic parameters and network parameters, and wherein the network parameters include a blade Internet Protocol (IP) address, a netmask, a gateway IP address, a blade identifier (ID), and a provisioning server IP address.

19. The apparatus of claim 16, wherein the secure channel is set up using a TLS protocol.

20. The apparatus of claim 16, further configured for communicating with a management application that can perform operations comprising:

customizing a boot agent code with the plurality of parameters to generate the boot agent, wherein the boot agent code is valid for substantially all blades in a blade server; and transferring the boot agent to the blade in response to the boot request.

* * * * *